(12) United States Patent
Scott-Collins et al.

(10) Patent No.: US 12,391,181 B2
(45) Date of Patent: Aug. 19, 2025

(54) BASE ASSEMBLY WITH CAMERA, CLEANING SYSTEM, BASE FRAME AND BASE COVER, REAR VIEW DEVICE, VEHICLE AND ASSEMBLING AND DIS-ASSEMBLING METHOD

(71) Applicant: Motherson Innovations Company Limited, London (GB)

(72) Inventors: Callum Scott-Collins, Portchester (GB); Jakub Spychala, Portchester (GB); Kane Connor, Portchester (GB); Graham Rehill, Portchester (GB); Andrew Lettis, Portchester (GB); Andreas Herrmann, Stuttgart (DE); Arne Schmierer, Stuttgart (DE); Simon David Field, Lonsdale (AU); Francis Charlet, Dammarie les Lys (FR); Steve Horne, Portchester (GB)

(73) Assignee: Motherson Innovations Company Limited, London (GB)

( * ) Notice: Subject to any disclaimer, the term of this patent is extended or adjusted under 35 U.S.C. 154(b) by 359 days.

(21) Appl. No.: 17/939,247

(22) Filed: Sep. 7, 2022

(65) Prior Publication Data
US 2023/0017426 A1    Jan. 19, 2023

Related U.S. Application Data

(63) Continuation-in-part of application No. PCT/EP2022/057697, filed on Mar. 23, 2022.

(30) Foreign Application Priority Data

Mar. 25, 2021    (DE) .......................... 102021107597.1

(51) Int. Cl.
*B60R 1/12*    (2006.01)
*B60J 10/78*    (2016.01)
(Continued)

(52) U.S. Cl.
CPC .................. *B60R 1/12* (2013.01); *B60R 1/06* (2013.01); *B60R 1/074* (2013.01); *B60R 1/1207* (2013.01);
(Continued)

(58) Field of Classification Search
CPC .. B60R 11/04; B60R 1/12; B60R 1/06; B60R 1/0602; B60R 1/074; B60R 1/1207;
(Continued)

(56) References Cited

U.S. PATENT DOCUMENTS

| 10,899,278 B2 | 1/2021 | Ichimura et al. |
| 2017/0253184 A1 | 9/2017 | Nishimoto et al. |

(Continued)

FOREIGN PATENT DOCUMENTS

| EP | 3798715 | 3/2021 |
| WO | 2019/086544 | 5/2019 |

OTHER PUBLICATIONS

UK Intellectual Property Office, Appl. GB2303781.5, Examination Report, Sep. 15, 2023.
(Continued)

*Primary Examiner* — Twyler L Haskins
*Assistant Examiner* — Akshay Trehan
(74) *Attorney, Agent, or Firm* — Jones Day

(57) ABSTRACT

The present disclosure refers to a base assembly of an exterior rear view device. The base assembly is configured to be mounted to a vehicle in a way that moveably supports a head assembly of the exterior rearview device. The base assembly comprises: a camera with a lens, a cleaning system with a nozzle for dispensing cleaning fluid onto the lens, a base frame, a base cover that comprises a plurality of cover pieces, and a camera cradle. The cover pieces provide a first opening for the lens and a second opening for the nozzle.

(Continued)

The camera cradle is mounted to the base frame for holding both the camera and the nozzle.

20 Claims, 34 Drawing Sheets

(51) Int. Cl.
    *B60Q 1/34*     (2006.01)
    *B60R 1/06*     (2006.01)
    *B60R 1/074*     (2006.01)
    *B60R 1/20*     (2022.01)
    *B60R 11/00*     (2006.01)
    *B60R 11/04*     (2006.01)
    *B60R 16/03*     (2006.01)
    *B60S 1/08*     (2006.01)
    *B60S 1/52*     (2006.01)
    *B60S 1/56*     (2006.01)
    *G03B 11/04*     (2021.01)
    *H04N 23/51*     (2023.01)
    *H04N 23/52*     (2023.01)
    *H04N 23/54*     (2023.01)
    *H04N 23/57*     (2023.01)
    *H04N 23/90*     (2023.01)

(52) U.S. Cl.
    CPC ................ *B60R 1/20* (2022.01); *B60R 11/04* (2013.01); *B60R 16/03* (2013.01); *B60S 1/0848* (2013.01); *B60S 1/52* (2013.01); *B60S 1/56* (2013.01); *G03B 11/045* (2013.01); *H04N 23/51* (2023.01); *H04N 23/52* (2023.01); *H04N 23/54* (2023.01); *H04N 23/57* (2023.01); *H04N 23/90* (2023.01); *B60J 10/78* (2016.02); *B60Q 1/34* (2013.01); *B60R 1/0602* (2013.01); *B60R 2001/1215* (2013.01); *B60R 2001/1253* (2013.01); *B60R 2011/004* (2013.01)

(58) Field of Classification Search
    CPC ... B60R 1/20; B60R 16/03; B60R 2001/1215; B60R 2001/1253; B60R 2011/004; B60S 1/02; B60S 1/52; B60S 1/56; B60S 1/0848; G03B 11/045; G03B 17/02; G03B 30/00; G03B 2217/00; G03B 2217/002; H04N 23/50; H04N 23/51; H04N 23/52; H04N 23/54; H04N 23/57; H04N 23/90; B60J 10/78; B60Q 1/34
    See application file for complete search history.

(56) References Cited

U.S. PATENT DOCUMENTS

| | | |
|---|---|---|
| 2019/0068845 A1 | 2/2019 | Krishnan et al. |
| 2021/0094474 A1* | 4/2021 | Vetter .................... B60S 1/528 |
| 2022/0176880 A1* | 6/2022 | Lettis .................... H04N 23/50 |
| 2022/0191369 A1 | 6/2022 | Ito et al. |

OTHER PUBLICATIONS

European Patent Office; Appl. 23195587.3; Extended European Search Report; Feb. 12, 2024.

* cited by examiner

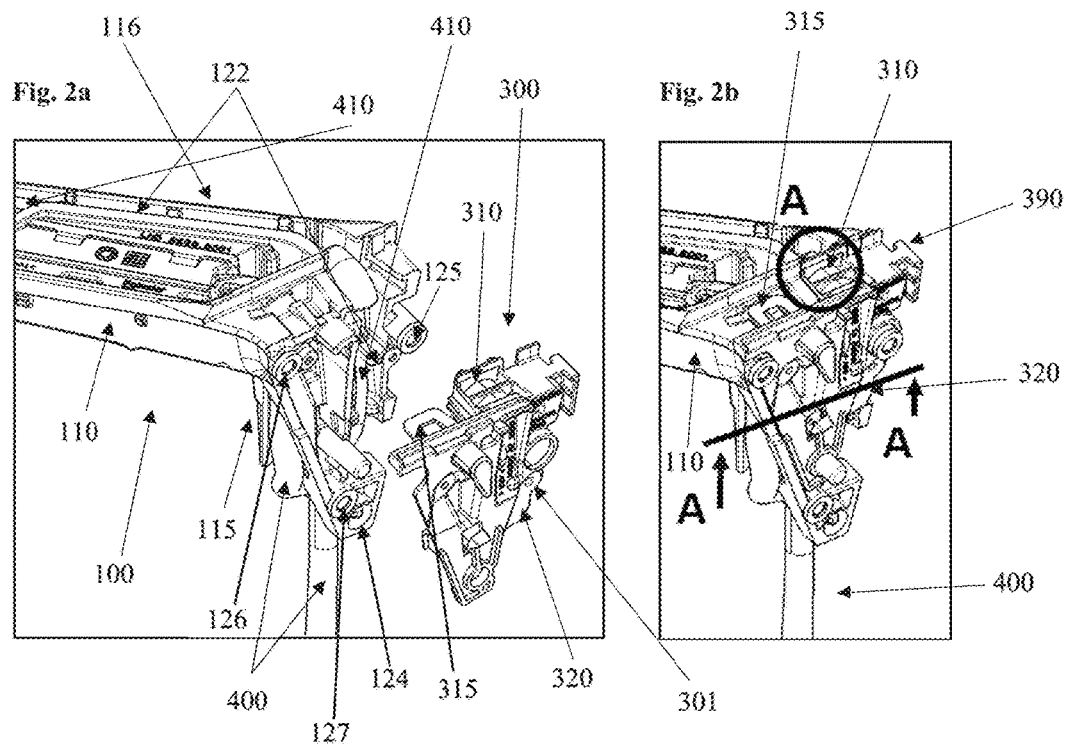
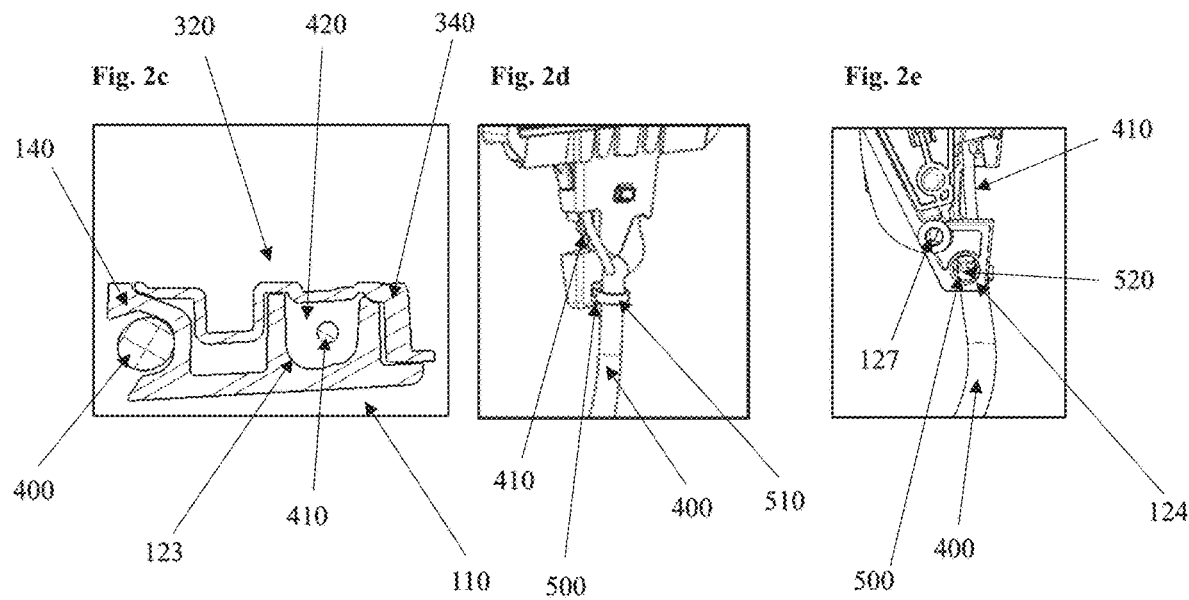

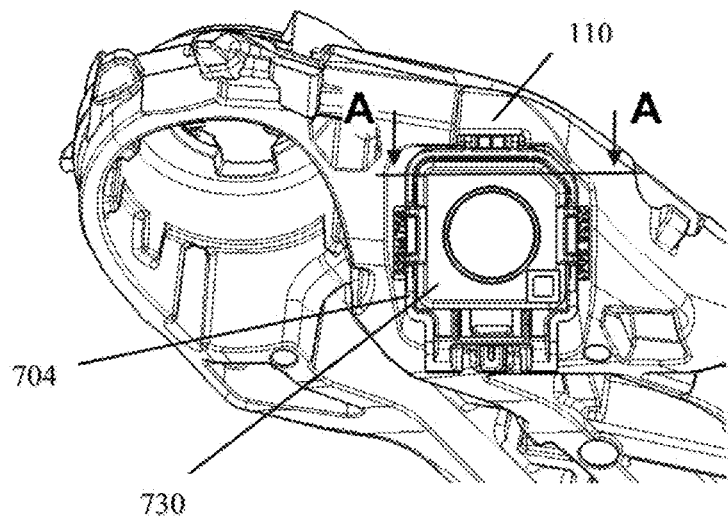
Fig. 8a
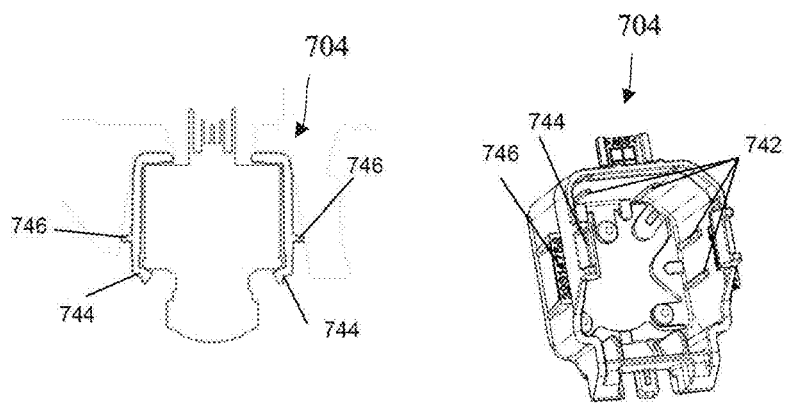
Fig. 8b
Fig. 8c

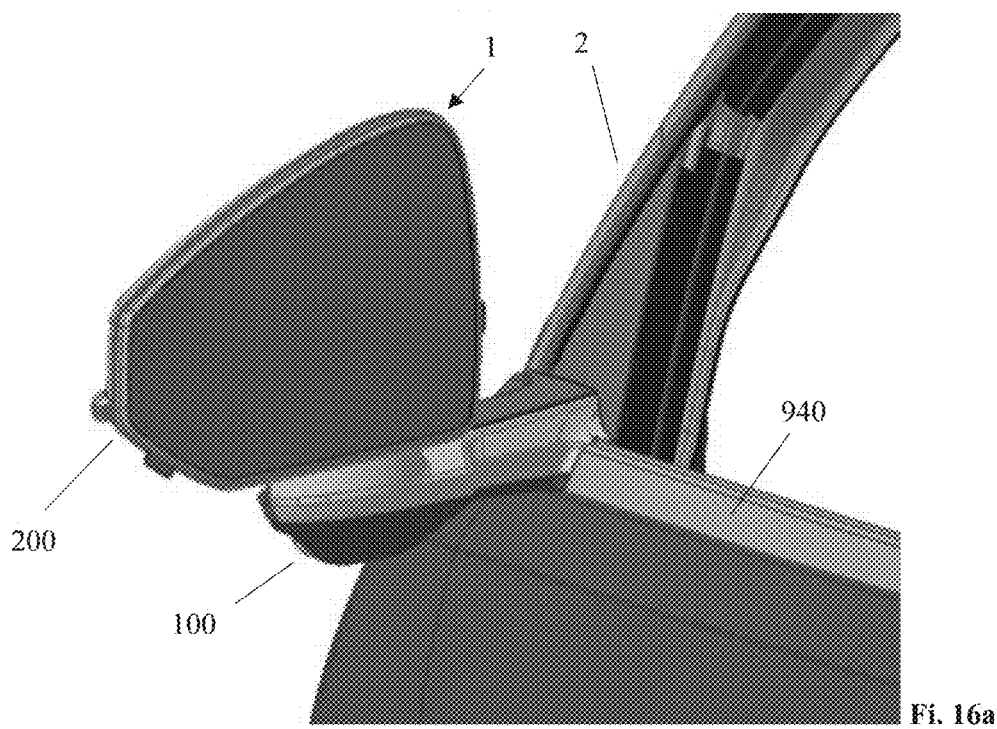
Fi. 16a

BASE ASSEMBLY WITH CAMERA, CLEANING SYSTEM, BASE FRAME AND BASE COVER, REAR VIEW DEVICE, VEHICLE AND ASSEMBLING AND DIS-ASSEMBLING METHOD

CROSS-REFERENCE TO RELATED APPLICATION

This application is a continuation-in-part of international application PCT/EP2022/057697 filed on Mar. 23, 2022, which claims priority to German patent application DE 10 2021 107 597.1, filed on Mar. 25, 2021, the entirety of which are incorporated herein by reference.

TECHNICAL FIELD

The present disclosure refers to a base cover of a base assembly of an exterior rear view device to be mounted to a vehicle, a rear view device with a head assembly and a base assembly comprising such a base cover, a vehicle with such a rear view device and a method for assembling as well as dis-assembling such a rear view device.

BACKGROUND

A rear view device typically includes a base assembly to be attached to a vehicle and a head assembly to be moveable relative to the base assembly. Generally the head assembly of a rear view device can be rotated between a driving position and a parking position.

The term "rear view" may refer to a view of the surrounding area, which is not in the field of view of a driver of a vehicle, i.e. the directions opposing, left, right, below and above of the viewing direction, but can also comprise the view in the direction of the viewing direction of the driver and/or any combinations of the directions. The rear view can be achieved via at least one rear view element in form of a reflective element like a mirror and/or an image acquisition means like a camera. The rear view, that is the field of view of the driver, can be adjusted by moving, in particular rotating, the reflective element and/or the image acquisition means. This in turn can be realized by moving the complete head assembly together with the reflective element and/or the image acquisition means such that the head assembly of the rear view device can be rotated also between a plurality of viewing position.

For moving the head assembly, the reflective element and/or the image acquisition means an actuator assembly is comprised by the rear view device, which can be controlled by a first control unit within the vehicle. Also the image acquisition means can be controlled via a second control unit, wherein both control units may be formed together. However, for the purpose of controlling data have to be transferred between the rear view device and the control unit within the vehicle requiring a harness.

For facilitating moving the head assembly together with the reflective element and/or the image acquisition means specific pivot joint systems have been developed, see WO 2018/215599 A1, as well as specific actuator assemblies, see WO 2019/002627 A1.

The structure of the base assembly of an exterior rear view device is important as it provides means for connecting the device to a vehicle. US 2020/0001791 A1 refers to a base assembly of an exterior rear view device, comprising a base frame; and a base cover housing the base frame and formed in at least two parts connected to each other, wherein the base assembly comprises a first opening at a first end of the base assembly at which the base frame is configured to be attached to a vehicle and a second opening at a second end of the base assembly at which a head assembly of the exterior rear view device is configured to be attached to the base frame, wherein at least one of a first sealing means at the first opening is provided comprising a two-component gasket with a hard component and a soft component, the hard component comprising: at least one first connection element configured to engage at least one first connection element of a first cover part; and at least one first connection element of a second cover part configured to provide a locking connection between the first cover part and the second cover part, and/or a second sealing means at the second opening is comprising a two-component gasket with a hard component and a soft component, the hard component comprising: at least one second connection element configured to engage at least one second connection element of the first cover part; and at least one second connection element of the second cover part to provide a locking connection between the first cover part and the second cover part.

The base frame fulfills a multitude of functions, in particular that of supporting the head assembly and connecting the same as well as electronic components of the exterior rear view device to the vehicle and a central control unit within the vehicle, respectively, with the latter attachment requiring a harness to be safely guided and sealed, electrically as well as with respect to moisture. As the base frame is made of metal, often aluminum, fulfilling said functions is a challenge.

The base frame is covered by one or more pieces to achieve a pleasing appearance and to adapt the exterior rear view device to the vehicle design. Further, the cover pieces have to fulfill technical functions, like water drainage and the like.

DE 10 2018 116 008 A1 discloses a base assembly of an exterior rear view device, comprising a base frame; and a base cover housing the base frame and formed in at least two parts connected to each other, wherein the base assembly comprises a first opening at a first end of the base assembly at which the base frame is configured to be attached to a vehicle and a second opening at a second end of the base assembly at which a head assembly of the exterior rear view device is configured to be attached to the base frame, wherein at least one of a first sealing means at the first opening is provided comprising a two-component gasket with a hard component and a soft component, the hard component comprising: at least one first connection element configured to engage at least one first connection element of a first cover part; and at least one first connection element of a second cover part configured to provide a locking connection between the first cover part and the second cover part, and/or a second sealing means at the second opening is comprising a two-component gasket with a hard component and a soft component, the hard component comprising: at least one second connection element configured to engage at least one second connection element of the first cover part; and at least one second connection element of the second cover part to provide a locking connection between the first cover part and the second cover part.

US 2015/0224930 A1 relates to an exterior rearview mirror assembly configured for mounting at an exterior portion of a vehicle, said exterior rearview mirror assembly comprising: a mounting arm configured for attachment at an exterior portion of a vehicle equipped with said exterior rearview mirror assembly; a mirror head attached at said mounting arm; an attaching element attached at a mirror reflective element; a shroud extending from said attaching element and partially received in said mirror head; a mirror actuator operable to adjust said attaching element and said mirror reflective element relative to said mirror head, wherein said mirror actuator adjusts said mirror reflective element, said attaching element and said shroud in tandem relative to said mirror head; and wherein said mirror reflective element is disposed outside of said mirror head and said shroud spans a gap between said mirror reflective element and said mirror head to substantially encase said attaching element.

US 2017/0253184 A1 discloses a vehicle side-view mirror comprising: a mirror base, which is fixed to a vehicle body; and a mirror head, which includes a mirror surface, is attached to the mirror base to be rotatable about an axis vertically extending with respect to the mirror base, and is switchable between a folded position and an operative position, wherein a gap is formed between the mirror base and the mirror head, a sleeve, which protrudes upward, is formed on the mirror base, an opening, into which the sleeve is inserted, is formed in a bottom of the mirror head, the sleeve has an outer peripheral surface on which a first outer peripheral surface and a second outer peripheral surface, which is located further in an inward radial direction of the sleeve than the first outer peripheral surface, are formed in a circumferential direction, the second outer peripheral surface is formed so as to extend smoothly in the circumferential direction of the sleeve, and a passage, which guides wind entering the gap into the mirror head, is formed between the second outer peripheral surface and an inner peripheral surface of the opening.

SUMMARY OF THE DISCLOSURE

It is the object of the present disclosure to provide a base cover of a base assembly of an exterior rear view device to be mounted to a vehicle fulfilling esthetic as well as technical functions.

This object is achieved according to a first aspect of the present disclosure by a base cover of a base assembly of an exterior rear view device to be mounted to a vehicle and to moveably support a head assembly, comprising three cover pieces designed to releasably mantle the base frame via clip, snap and/or latch connections, in particular without screw connections.

Embodiments of the base cover can be further defined in that the three cover pieces comprise a lower base cover, a base cover cap and an upper base cover and/or are made from plastic, and/or the three cover pieces isolate the base frame being made from a metal; and/or the three cover pieces cover an arm of the base frame from a door attachment portion to a head attachment portion of the base frame, and/or the three cover pieces are connected by clip, snap and/or latch connections, with said connections preferably being provided between the three cover pieces, or the three cover pieces and a sealing means adapted to be arranged between the door and the base frame, or the three cover pieces and the base frame, or the three cover pieces, the sealing means and the base frame to provide the base assembly.

Other embodiments characterized in that the lower base cover is provided with an opening for a camera attached to the base frame, in particular via a camera cradle, and/or a drain hole, and/or the lower base cover is provided with one or more first attachment means, in particular five clips and a multi-functional assembly projection, for attachment to the base frame; and/or the lower base cover is provided with one or more second attachment means, in particular comprising three hooks, for attachment to the sealing means, in particular a door gasket substrate of the sealing means; and/or the lower base cover has an edge to engage the sealing means, in particular a door seal gasket of the sealing means and/or for an outer sealing; and/or the lower base cover is provided with one or more third attachment means for attachment to the base cover cap, in particular comprising the multi-functional assembly projection and openings, and/or the lower base cover is provided with one or more fourth attachment means for attachment to the upper base cover, in particular comprising a pocket and openings.

Further, the base cover cap may be provided with an opening for a camera attached to the base frame, in particular via a camera cradle; and/or the base cover cap may be provided with one or more fifth attachment means for attachment to the lower base cover, in particular comprising peg like projections and a tab; and/or the base cover cap may be provided with one or more sixth attachment means for attachment to the upper base cover, in particular comprising peg like projections, a slot and two clips, preferably in form of two leaf spring clips adapted to rest on the base frame at the root and end, allowing the middle portion there between to flex downwards; and/or the base cover cap is provided with one or more seventh attachment means for attachment to the base frame, in particular comprising at least one clip.

Still further, embodiments may be defined in that the upper base cover is provided with an opening for a camera attached to the base frame, in particular via a camera cradle; and/or the upper base cover is provided with one or more eighth attachment means for attachment to the lower base cover, in particular comprising location pegs and/or at least one clip; the base cover cap is provided with one or more ninth attachment means for attachment to with the base cover cap, in particular comprising clip retention extensions and at least one alignment projection, and/or the upper base cover is provided with one or more tenth attachment means, in particular a hoop clip, for engagement with the sealing element, in particular a projection of the door gasket substrate.

Embodiments may also be characterized by a glare shield surrounding a lens of a camera, in particular the lens extending through the opening of the base cover cap, and providing an opening through which the camera can obtain images, wherein preferably the glare shield is configured to be releasably attached to at least one of the three cover pieces and/or a camera cradle of the camera via at least one the via clip, snap and/or latch connection.

It may be that the glare shield is provided with at least one clip, wherein preferably the at least one clip of the glare shield is configured to at least one of engaging the base cover cap or at least one extension or lug of the base cover cap and being supported by the camera cradle or at last one retention tab of the camera cradle.

According to a second aspect of the present disclosure, an exterior rearview device is provided, which comprises a base assembly with a base frame to be attached to a vehicle, a head assembly for supporting at least one reflective element, display element and/or camera, with the head assembly being attached to the base assembly in a moveable manner, and a sealing means adapted to be installed between the base assembly and a door of the vehicle, wherein the base frame is mantled with a base cover according to the present disclosure.

Said exterior rear view device may further comprise at least one camera, preferably positioned in a non-moving area of the moveable head assembly or in the base assembly, in particular attached to the base frame and/or viewing through an opening provided by one of three cover pieces, and/or a camera cradle which is configured to be attached to the base frame, in particular by a friction fit and without any separable attachment element, with the camera cradle preferably being a plastic unit for isolating the camera from the base frame; and/or a retainer means between the base frame and the sealing means, with the retainer means preferably being a plastic unit for sealing and guiding harness.

According to embodiments the exterior rear view device may comprise an articulation assembly for moving the head assembly relative to the base assembly, and/or at least one functional device, comprising a light module, a turn signal indicator module, a blind spot indicator module, or a human machine interface, a Bluetooth module, a sensor module, a temperature sensor, a touch sensor or a contamination sensor, and a cleaning device for cleaning the lens, in particular comprising at least one fluid port or nozzle, and/or a control unit, in particular adapted for controlling at least one of the display element, the articulation assembly and the functional device.

It may be that the display element is configured to be at least one of viewable through the reflective element when activated and activated by at least one of a driver of the vehicle, depending on an output signal of the sensor module, via a vehicle control system and/or via the control unit.

According to a third aspect of the present disclosure a vehicle with the door having a door panel and supporting a window as well as a cheater channel sealed by glass run seal is provided, wherein the door panel also supports the exterior rear view device of the present disclosure.

It is proposed that the glass run seal is arranged within a channel provided by the base frame with the retainer means and the sealing means; and/or a lip of the glass run seal engages the cheater panel and the upper base cover; and/or the glass run seal is at least partly covered by a waist finisher such that the base assembly extends from the waist finisher.

According to a fourth aspect of the present disclosure the same provides a method for assembling the base cover of the present disclosure, wherein the base cover cap, the lower base cover and the base cover cap are connected by snap, clips and/or latch connections to each other and the base frame, without screws, and the assembly of the base cover cap, the lower base cover and the upper base cover on the base frame is secured by engaging the sealing means.

Said assembling method may further comprise the following steps: comprising the following steps attaching the lower base cover to the sealing means and the base frame, wherein preferably an edge of the lower base cover is brought into engagement with the door gasket seal such that the lower base cover can be rotated until it connects with the base frame and its opening is arranged to allow the camera to view out of the cover, with in particular the hooks the lower base cover being rotated into hook pockets and/or between ribs provided by the door gasket substrate.

Further, it may be that the assembling method may comprise the following step: attaching the base cover cap to the lower base cover, wherein preferably the base cover cap is attached at one end to the lower base cover for creating a rotation point to rotate the base cover cap into its final position with attachment also at its other end, with in particular the tab at the end of the base cover cap, which faces the door attachment portion of the base frame, being entered into the opening of the lower base cover for defining the attachment direction and locks in behind the lower base cover for creating a rotation point, and/or with in particular the base cover cap being forced to flex outboard while being rotated into its final position, and/or with in particular the peg type projection at the end of the base cover cap, which faces the head attachment portion of the base frame, being entered into a first slot in the multi-functional assembly projection of the lower base cover and another peg type projection of the base cover cap being entered into another slot in the multi-functional assembly projection of the lower base cover as well as flexes back into the opening of the lower base cover for controlling the final fit of the base cover cap.

Still further, said assembling method may comprise the following steps: attaching the upper base cover to the base cover cap and the lower base cover, wherein preferably the attachment of the upper base cover is assisted by the base cover cap being assembled to the base frame by providing a ramp guiding a rotational movement of the upper base cover with in particular the upper base cover being attached at one end to the lower base cover and the base cover cap for creating a rotation point to rotate upper base cover into its final position with attachment also at its other end, and/or with in particular the two location pegs at the end of the upper base cover, which faces the head attachment portion of the base frame, being fitted into two corresponding slots, one being provided by the opening in lower base cover and the other by the slot being formed in the projection of the base cover cap, and/or with in particular the outermost location peg pulling the base cover cap into its final position and defining a rotation axis; and/or with in particular rotating the upper base cover until the four location projections position the upper base cover on the lower base cover, and/or with in particular the ramp is provided by the two clips next to the end of the upper base cover, which faces the head attachment portion of the base frame, by said two clips resting on the base frame at their roots and ends, allowing the middle portions to flex downwards, and/or with in particular the projections align the upper base cover and lead the clip retention extensions onto the corresponding clips of the base cover cap, and/or with in particular the clip at the end of the upper base cover, which faces the door attachment portion of the base frame, being entered into the pocket in the lower base cover, and/or with in particular the hoop clip at the end of the upper base cover, which faces the door attachment portion of the base frame, engaging with the projection of the door gasket substrate.

According to an embodiment, the following step may be comprised: connecting the glare shield for the camera, preferably by pushing the same between the base cover cap and the cradle of said camera, with in particular pushing the at least one clip in engagement with the at least one extension or lug of the base cover cap and the at last one retention tab of the camera cradle, and/or with in particular the connecting step of the glare shield being the last step of assembling the base cover.

According to a fifth aspect of the present disclosure the same provides a method for dis-assembling the base cover of the present disclosure, in particular after assembling the base cover with a method of the present disclosure, wherein the base cover cap, the lower base cover and the base cover cap are dis-mantled with a single tool by dis-lodging the snap, clips and/or latch connections and/or with the base frame being mounted to the vehicle.

The dis-assembling method can be further defined in that the tool is a metal piece, preferably made out of aluminum, and/or the tool has a maximum diameter of 4 mm, preferably is in form of a cylinder or pin; and/or the tool locks the mirror head assembly in a knock forward position to gain access to a camera connector and/or the camera when the base cover cap, the lower base cover and the base cover cap have been dis-mantled from the base frame; and/or the tool dis-engages at least one of the snap, clips and/or latch connections.

In addition, said dis-assembling method may comprise the following steps, when the base cover has been assembled with the method of the present disclosure: accessing the hoop clip of the upper base cover through a slot in door panel to loosen the engagement with the projection of the door gasket substrate, and/or passing through the drain hole of the lower base cover to loosen the engagement of the clip of the upper base cover with the pocket of the lower base cover, and/or removing the upper base cover by pulling its clip retention extensions out of the two clips of the base cover cap, and/or dis-mounting the base cover cap by dis-engaging its clip from the location projection of the base frame, preferably by using the tool, and its peg projections from the multi-functional assembly projection of the lower base cover, preferably by pushing them out of position, such that the base cover cap can rotate out, and/or dis-engaging the five clips of the lower base cover from the base frame such that the lower base cover can be removed.

The dis-assembling method can also comprise the following step: locking the mirror head assembly in the knock forward position by inserting the tool into a recess or hole of the base frame to access a mechanical stop of a case frame of the head assembly from the bottom of the base assembly; wherein preferably all parts the tool interfaces with are made from aluminum.

According to an embodiment, the following step may be comprised: the glare shield is dis-mantled, preferably with the tool, by dis-lodging the snap, clips and/or latch connections, with in particular the dis-mantling of the glare shield being the first dis-mantling step.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 2a is a perspective view of a part of the base frame of FIG. 1b as well as a retainer means of a retainer assembly to be interposed between the base assembly and a vehicle (not shown);

FIG. 2b is a perspective view of the retainer means of FIG. 2a attached to the base frame of FIG. 2a;

FIG. 2c is a cross-section of the retainer means and the base frame of FIG. 2b along line A-A;

FIG. 2d is a perspective view of the lower end of the base frame in FIG. 2a from the opposite side compared to FIG. 2a;

FIG. 2e is a perspective view of the lower end of the base frame in FIG. 2a from the same side as FIG. 2a;

FIG. 3a is a perspective view of a part of the base frame of FIG. 2a;

FIG. 3b is a perspective view of the retainer means of FIG. 2a;

FIG. 3c is a perspective view of retainer means of FIG. 3b attached to the base frame of FIG. 3a;

FIG. 8a is a perspective view of a camera cradle assembled in the base frame of FIG. 1b;

FIG. 8b is a cross-sectional view of the camera cradle as assembled in the base frame along the cross sectional line A-A shown in FIG. 8a;

FIG. 8c is a perspective view of the camera cradle of FIGS. 8a and 8b;

FIGS. 10a and 10b are perspective views demonstrating the assembly of a base cover cap to the sub-assembly shown in FIG. 7a;

FIGS. 16a to 16l are perspective views demonstrating details of the dis-assembly of all 3 cover pieces;

FIG. 18b is a cross-sectional view of the rearview device of FIG. 18a;

DETAILED DESCRIPTION

Figure 1A:
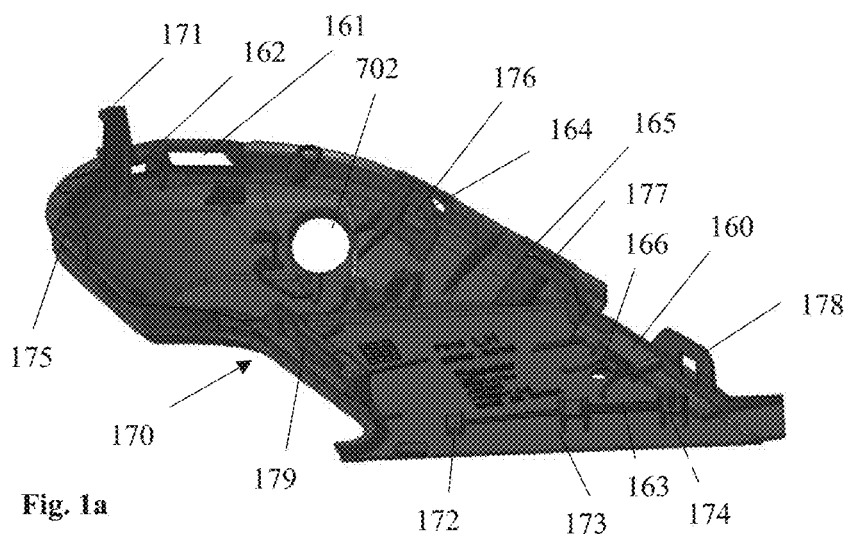
FIG. 1a is a perspective view of a lower base cover of a base assembly of a first exterior rear view device of the present disclosure.
Figure 1B:
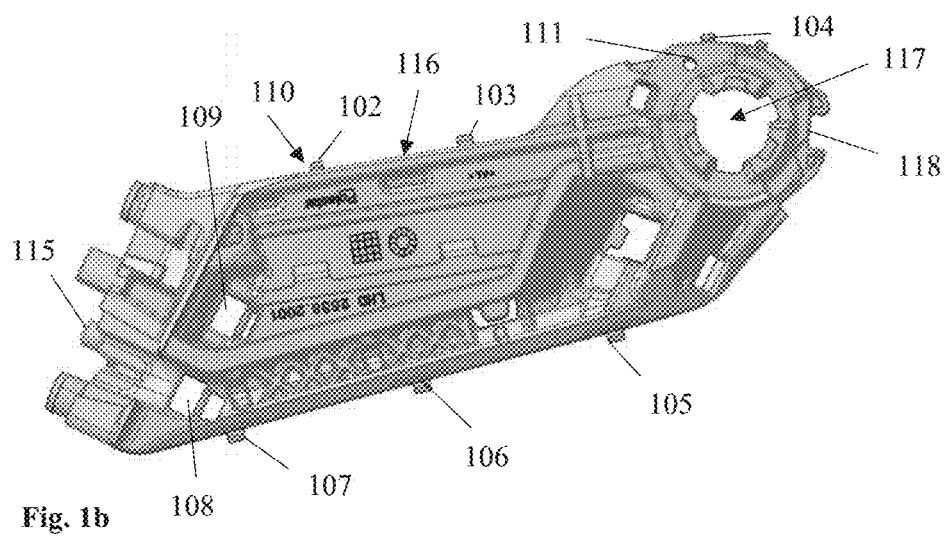
FIG. 1b is a perspective view of a base frame to which the lower base cover of FIG. 1a is to be attached.
Figure 1C:
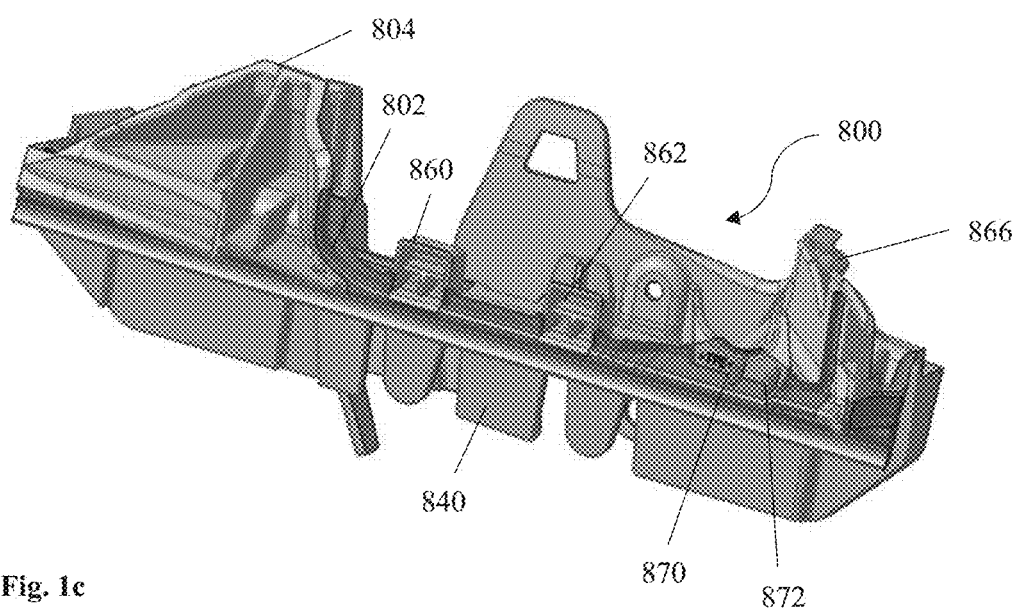
FIG. 1c is a perspective view of a sealing means, to be attached to both the lower base cover of FIG. 1a and the base frame of FIG. 1b.
Figure 1D:
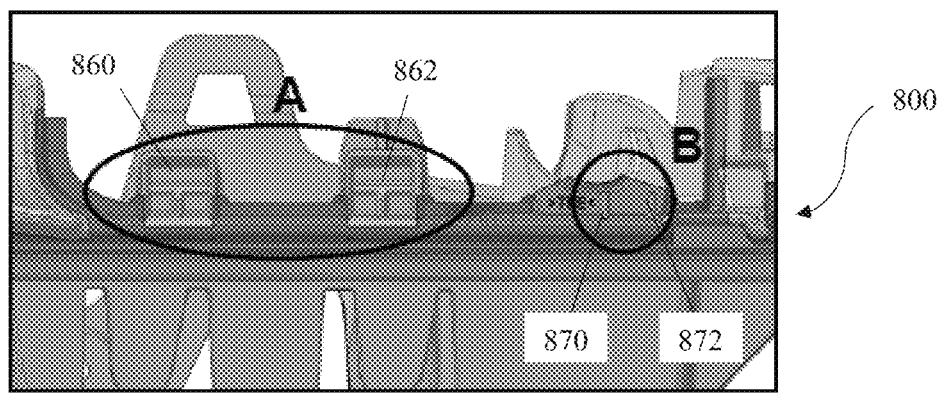
FIG. 1d is a part view of the sealing means of FIG. 1c.

FIGS. 1a to 1f show a base cover lower or lower base cover 170 and a base frame 110 of a base assembly 100 of a first exterior rear view device 1 of the present disclosure. The exterior rear view device 1 is adapted to be mounted to a vehicle 2 as shown in particular in FIG. 9b. Further, FIGS. 1c and 1d show a sealing means 800. The sealing means 800 is to be attached to both, the lower base cover 170 and the base frame 110 and to be arranged between the base assembly 100 and the vehicle 2. Before describing the attachment of the lower base cover 170, the base frame 110 and sealing means 800 to each other, the structural features of each one of these three elements is described.

Figure 6A:
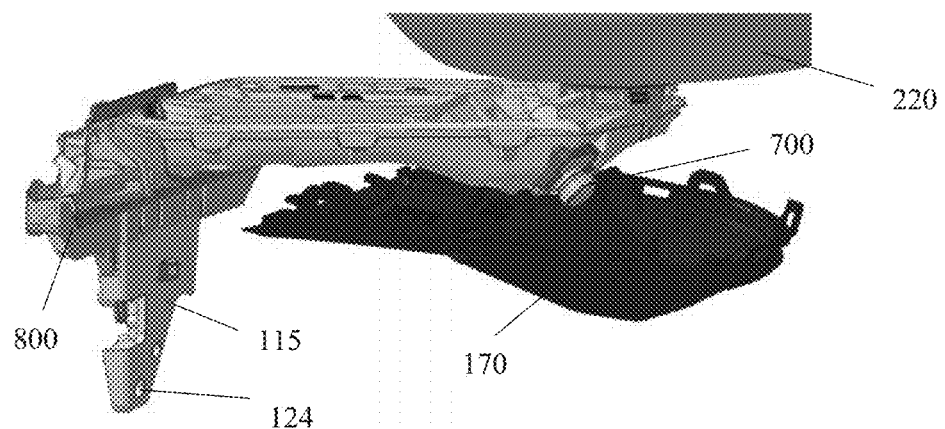
FIGS. 6a to 6c are perspective views demonstrating the attachment of the lower base cover of FIG. 1a to the base frame shown in FIG. 1b to which in particular the retainer assembly of FIG. 5a is attached.
Figure 6B:
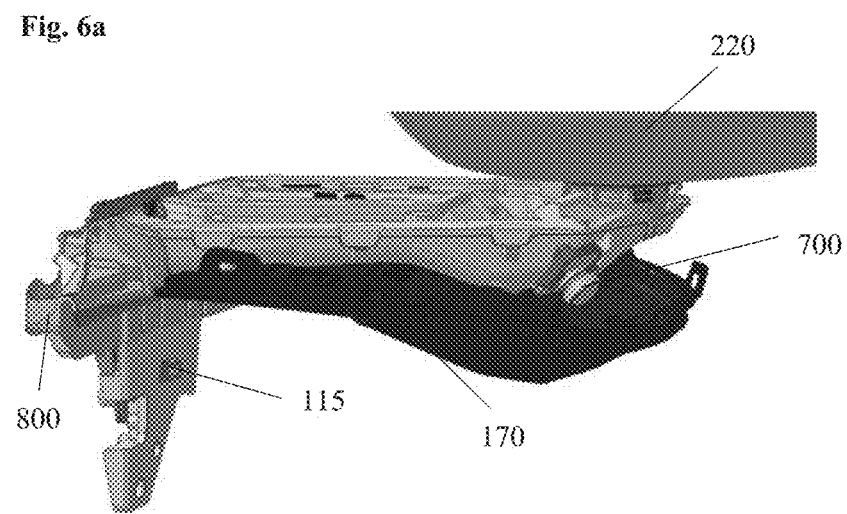

The lower base cover 170 of FIG. 1a is a single plastic piece with a multi-functional assembly projection 171, several hooks 172 to 174, several clips 175 to 179, a pocket 160, several openings 161, 162, 164 and 165 and a wall 163. Further, the lower base cover 170 provides an opening 702 for a camera 700, see FIG. 6b, and a drain hole 166.

The base frame 110 of FIG. 1b is provided in form of an aluminum unit with a plurality of clips 102 to 107 and three hook apertures 108, 109 and 118. The unit can be divided into three portions, i.e. a door attachment portion 115, an arm 116 and a head attachment portion 117, with the door attachment portion 115 running substantially parallelly to a door 600 of the vehicle 1 shown in FIGS. 9a and 9b, whereas the arm 116 extends substantially perpendicularly away from the door attachment portion 115 and the head attachment portion 117 is provided at the end of the arm 116 opposite the one merging with the door attachment portion 115. In the head attachment portion 117 a hole 111 for a tool (not shown) used when dis-assembling cover pieces of the base frame 110. But first, the assembly of said cover pieces is described.

The sealing means 800 of FIG. 1c is provided in form of a 2K door gasket with a door gasket seal 802 and a door gasket substrate 804. The door gasket substrate 804 is formed with several clips 840 (only one being shown in FIG. 1c), two hook pockets 860 and 862, two location ribs 870 and 872 and one attachment projection 866 discussed in detail below.

Figure 1E:
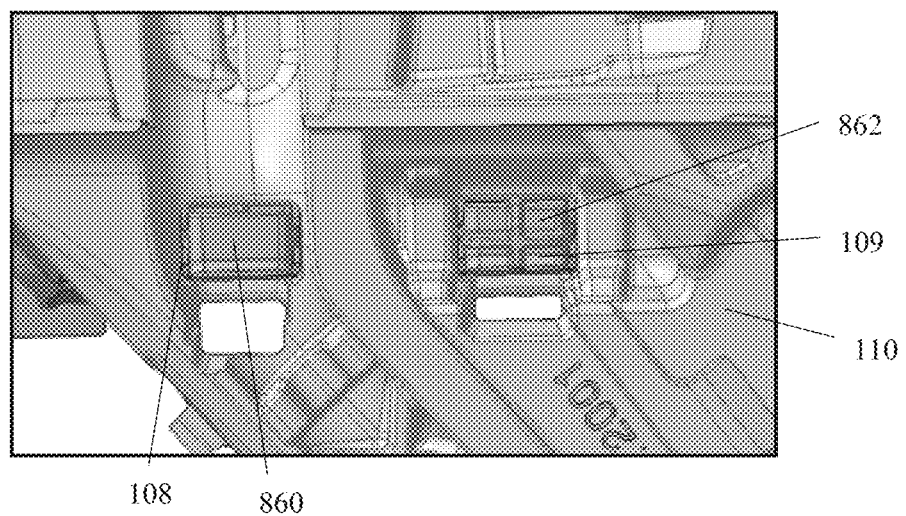
FIG. 1e is a perspective part view of a connection between the sealing means of FIG. 1c with the base frame of FIG. 1b.
Figure 1F:
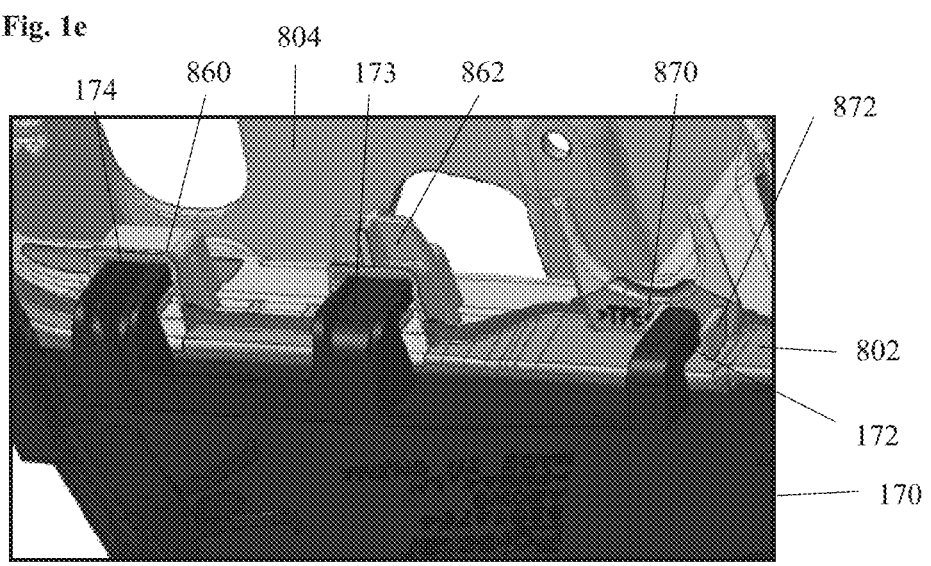
FIG. 1f is a perspective part view of a connection of the lower base cover of FIG. 1a to the sealing means of FIG. 1c.

FIGS. 1d and 1e demonstrate the attachment of the lower base cover 170 of FIG. 1a, being one of three cover pieces of the base frame 110, to the base frame 110 shown in FIG. 1b. The combination of the base frame 110, the sealing means 800 and the lower base cover 170 is shown in FIG. 1f providing a locking system without the need of screws and accommodating a location as well as assembly method.

The lower base cover assembly method allows a secure mounting of the components without using screws, as
- the lower base cover 170 is provided with the three hooks 172 to 174, the five clips 175 to 179 and the multi-functional assembly projection 171,
- the base frame 110 is provided with the two hook apertures 108 and 109, the 5 clips 103 to 107 and a recess or an aperture 118 for the multi-functional assembly projection 171, and
- the sealing means 800 is provided with the two hook pockets 860 and 862 and two hook ribs 870 and 871.

In detail, the hook pockets 860 and 862, provided by the door gasket substrate 804 and shown in region A in FIG. 1d, are door gasket location features with multiple functions. They provide location and positional control whilst assembling the sealing means 800 to the base frame 110, with the hook pockets 860 and 862 of the sealing means 800 passing through the hook apertures 108 and 109 of the base frame 110 as soon as the sealing means 800 is attached to the base frame 110, see FIG. 1e. Along with the two ribs 870 and 872, shown in region B in FIG. 1d, the hook pockets 860 and 862 are used to assemble the lower base cover 170. As shown in FIG. 1f, the hooks 173 and 174 of the lower base cover 170 are engaged within the hook pockets 860 and 862 of the sealing means 800. Further the third hook 172 of the lower base cover 170 is located between the two ribs 870 and 872 of the sealing means 800. Thus, the hook pockets 860 and 862 and the ribs 870 and 872 of the sealing means 800 lock and locate the door gasket seal in all X+Y+Z directions. Critically the Z direction is locked which allows an accurate positional location for the sealing strategy.

Before further describing said sealing strategy, the assembly of the base frame 110 with a retainer means 301 and to a door panel 605 is described with reference to FIGS. 2a to 3d.

Figure 3A:
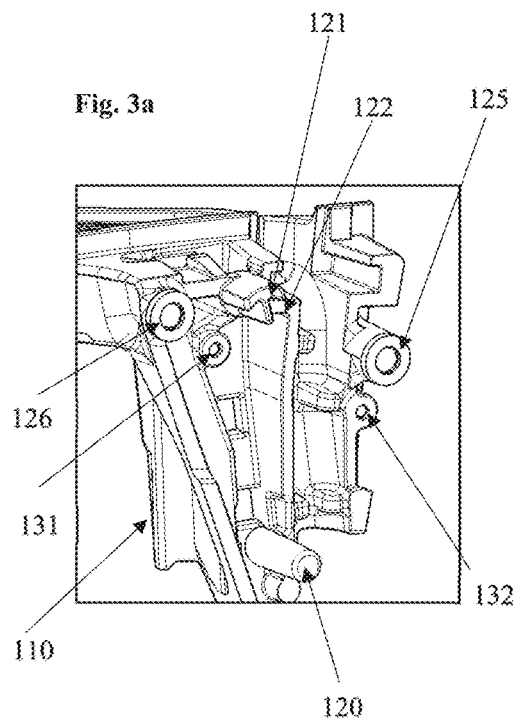
Figure 3B:
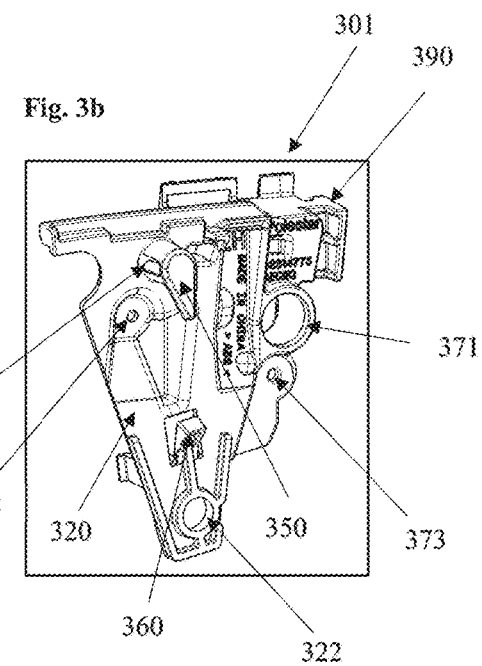
Figure 3C:
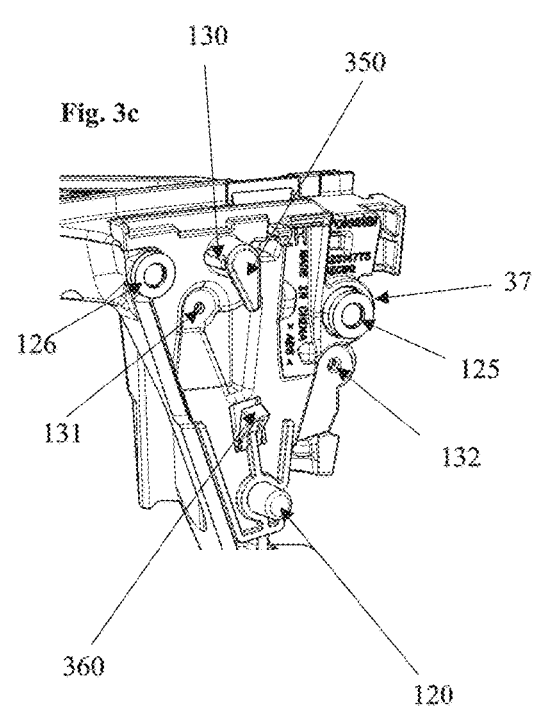

The retainer means 301, best seen in FIGS. 2b and 3b, may be manufactured from a plastic material and it provides a retainer assembly 300, together with the sealing means 800, to be arranged between the base frame 110 of the base assembly 100 of the exterior rear view device 1 and the door panel 605 of the door 600 of the vehicle 2.

The FIGS. 2a to 2e also show a harness 400 for electrically connecting in particular a power source and a control unit within the vehicle (not shown) with electric components of the exterior rear view device. Such electric components may comprise, as e.g. shown in FIGS. 4a to 4f, an actuator assembly 210 suitable for moving a head assembly 200 together with a reflective element (not shown) relative to the base frame 110 supporting the head assembly 200, and a camera 700 as well as an indicator means like a turn signal indicator 710 shown in particular in FIG. 9*b*. Said harness 400 may comprise a camera harness 410.

The retainer means 301 is a multi-function component. The different functions will be described with respect to the other components of the exterior rear view device 1 as well as the vehicle 2 in the following.

An important function of the retainer means 301 is harness sealing, managing harness routing and accommodating variation in the camera harness 410 and cleaning systems (not shown), as described in the following.

The door attachment portion 115 of the base frame 110 is provided with an opening 124 for a harness holder 500 at its lower, free end, as best seen in FIGS. 2*d* and 2*e*. Said harness holder 500 is formed with a fixing tie 510 for holding the harness 400 and a clip 520 for connecting the holder 500 to said door attachment portion 115 by passing through the opening 124.

The base frame harness locator opening feature governs harness position length the door side and the rear view device side, and provides a strong retention eliminating risk of the harness 400 being misplaced e.g. by being pulled through during handling. Further, the locating feature leads to reduced tolerance of fit-to-door. In other words, the harness 400 is firmly located to the base frame 110 in all directions allowing a solid datum strategy for harness lengths and provides the ability to hold as well as transport the exterior rear view device 1 whilst holding on to the harness 400.

The harness 400 as well as the camera harness 410 divided therefrom above the harness holder 500 extend between the door attachment portion 115 of the base frame 110 and a holding portion 320 of the retainer means 301 to an upper end of the door attachment portion 115, which turns into the arm 116 of the base frame 110.

The retainer means 301 is provided with guiding means for guiding the camera harness 410 to a sealing portion 310 of the retainer means 301 extending substantially perpendicularly to the holding portion 320 to cover the camera harness 410 at its bending region at the transition between the door attachment portion 115 and the arm 116, see region A in FIG. 2*b*.

While the base frame 110 is provided with a harness guiding channel portion 140 for guiding the harness 400 and a camera harness guiding channel portion 123 for guiding the camera harness 410, the holding portion 320 of the retainer means 301 also provides a camera harness guiding channel portion 340 to substantially close a channel 420 for the camera harness 410, as shown in FIG. 2*c*.

As the retainer means 301 is not metallic, the sealing of the harness 400, together with the camera harness 410, as well as the attachment of the metallic base frame 110 to the door panel 605 becomes safer. The design of the retainer means 301 allows to accommodate different sets of harness and cleaning system for all variations of mirror trim level. Further, the retainer means 301 ensures an easy assembly to seal in particular the camera harness 410 after being mounted and to manage its routing along the base frame door attachment portion 115, without departing from the commonly used datum system between the base frame 110 and the door panel 605.

Figure 3D:
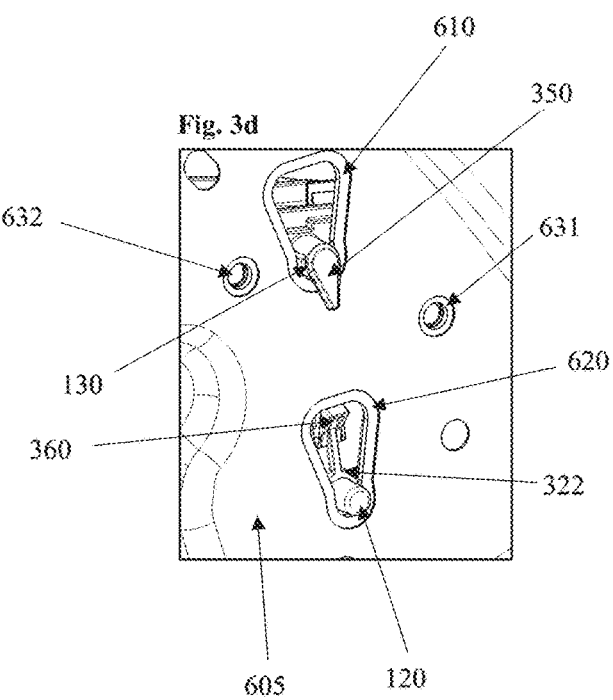
FIG. 3d is a perspective view on the retainer means and the base frame attached to a vehicle, from the side of a door panel.

The base frame 110 is provided with a location pin 120 as well as a T shaped location projection 121 belonging to the datum system ensuring a correct assembly of the components of the exterior rear view device 1 and a correct attachment of the exterior rear view device 1 to the vehicle 2. The location pin 120 and the T shaped location projection 121 extend substantially perpendicularly to the plane of the door panel 605, as can be best seen in FIGS. 3*a* and 3*d*. The retainer means 301 is provided with an opening 322 for the location pin 120 and a hook 350 with openings 351 for the arms of T shaped location projection 121, as can be best seen in FIG. 3*b*. FIG. 3*d* illustrates that the location pin 120 as well as the T shaped location projection 121 pass through the respective openings 322, 351 of the retainer means 301 to also pass respective openings 610, 620 within the door panel 605 to engage the same, with the hook 350 of the retainer means 301 ensuring the respective engagement.

The base frame T shaped location projection 121 and the location pin 120 provide the primary and secondary datum strategy to the door datum system in X+Z directions, while the Y direction is controlled by using screws. The door panel 605 in FIG. 3*d* shows two screw openings 631 and 632 aligned to two screw openings 131 and 132 of the base frame 110, respectively, which in turn pass openings 371 and 372 of the retainer means 301.

Thus, the corresponding locating features of the base frame 110 and the retainer means 301 allow the base frame datum features to interface with the door 600 minimizing tolerance of datum strategy.

Further location projections 125 and 126 are provided by the door attachment portion 115.

The retainer means 301 along with the location pin 120 and the T shaped location projection 121 not only provides an accurate assembly to the door panel datum system, but also facilitates the assembly as it provides a robust 3rd hand clip/hanger function.

The retainer means 301 provides a first clip 315, which serves the attachment to the base frame 110 as best seen in FIGS. 2*a* and 2*b*. The hook 350 primarily serves to hold the exterior rear view device 1 in Y direction to assist assembly of the screws (not shown), while the second clip 360 is on secondary location keyway to highlight when the exterior rear view device 1 is in its final assembly Z position, as best seen in FIG. 3*d*.

Next, the assembly of the base frame 110 and the retainer means 301 with a case lower or lower case 220 of the head assembly 200 of the exterior rear view device 1 and the sealing means 800 is described with reference to FIGS. 4*a* to 4*f*.

The slim design of the base frame 110 allows the lower case 220 of the head assembly 200 to be assembled over the door attachment portion 115 and the arm 116 of the base frame 110 to reach the region of the head assembly 200 with the actuator assembly 210, as shown in FIGS. 4*a* to 4*d*. In this respect it is to be noted that it is critical to assemble high gloss components like the lower case 220 late in the assembly sequence to minimize risk of damage. For that purpose the lower case 220 is provided with an opening 222, preferably being substantially circular, through which the base frame 110 together with the retainer means 301 can pass.

Figure 4A:
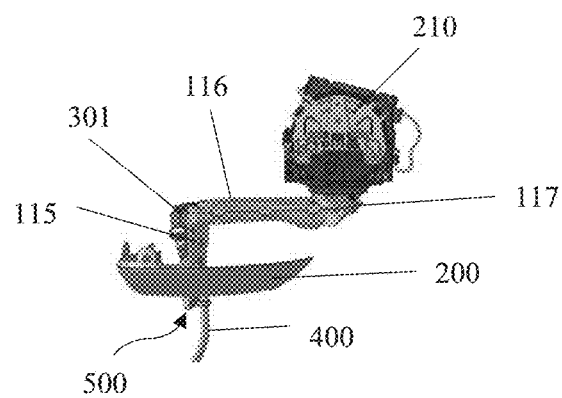
FIGS. 4a to 4f are perspective views demonstrating the assembly of the base frame with the retainer means firstly to a lower case of a head assembly of an exterior rear view device of the present disclosure and secondly to the sealing means of FIG. 1c.
Figure 4B:
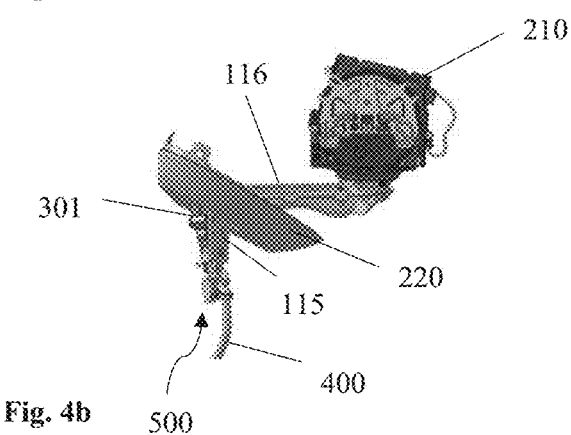
Figure 4C:
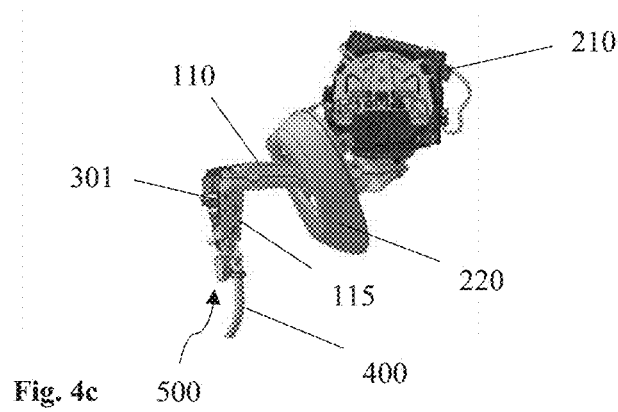
Figure 4D:
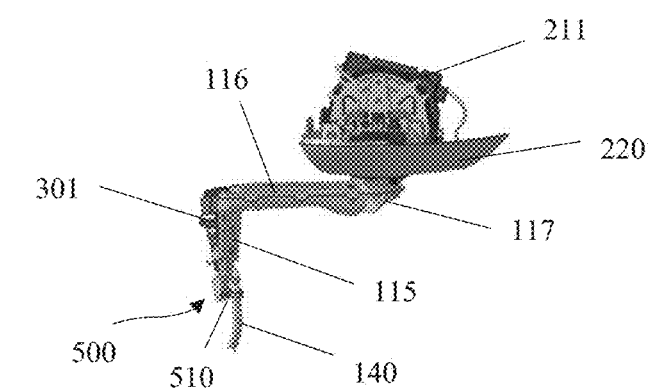
Figure 4E:
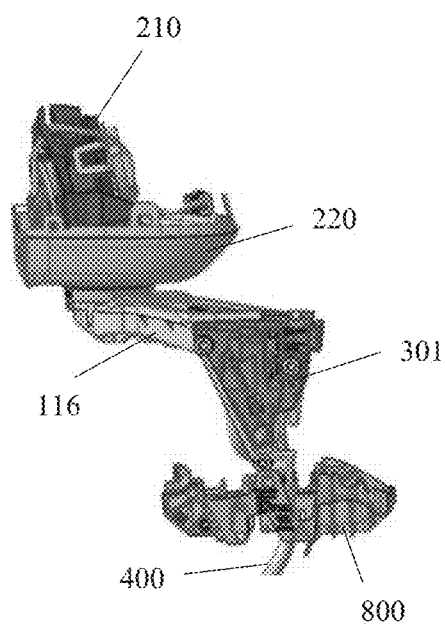
Figure 4F:
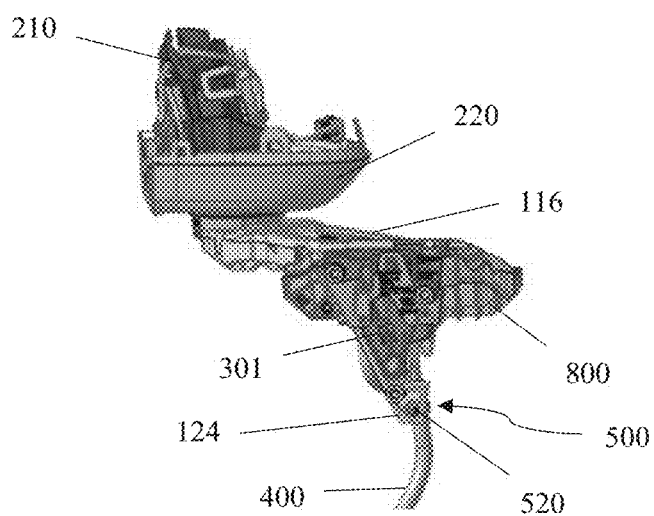

The sealing means 800 is mounted after the lower case 220, as shown in FIGS. 4*e* and 4*f*. The sealing means location strategy is critical as it dictates the datum strategy for the corresponding base cover components.

As already mentioned above, the smaller base frame geometry and the provision of a separate 2K door gasket provided by the sealing means 800 permit the lower case 220 to be assembled over the base frame 110. In the following the attachment of the sealing means 800 to the base frame 110 with the retainer means 301 is described with reference to FIGS. 5*a* to 5*c*.

Clips 810, 830 and 840 as well as clip opening 820 allow to attach the sealing means 800 to the base frame 110 which is provided with complementary steps 135 and 136 and openings 137 and 138. The base frame 110 also is provided with the location projections 125 to 126, with two of said location projections 125 and 125 extending through the retainer means 301 as well as the sealing means 800 attached on top of the retainer means 301, see FIG. 5a.

Figure 5A:
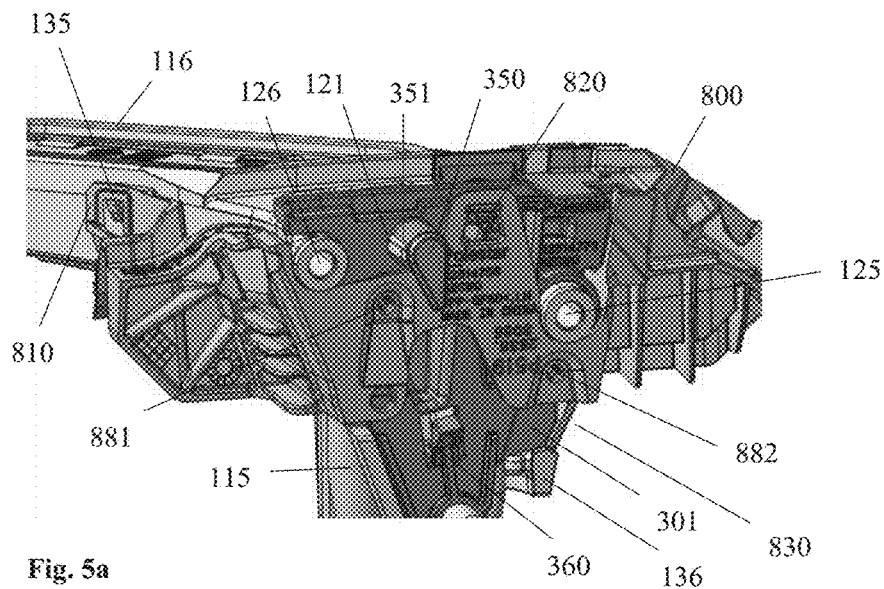
FIGS. 5a to 5c are perspective views demonstrating attachment features of the sealing means of FIG. 1c.
Figure 5B:
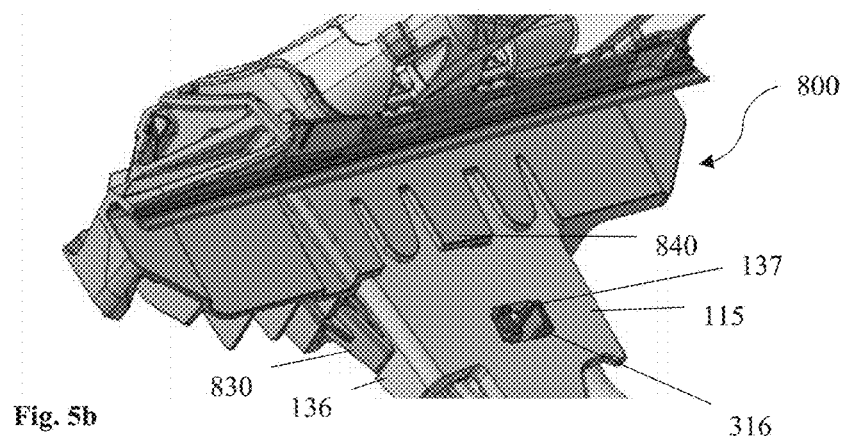

FIG. 5b also shows a clip 316 of the retainer means 301 engaging a respective opening 137 provided by the base frame 110.

Figure 5C:
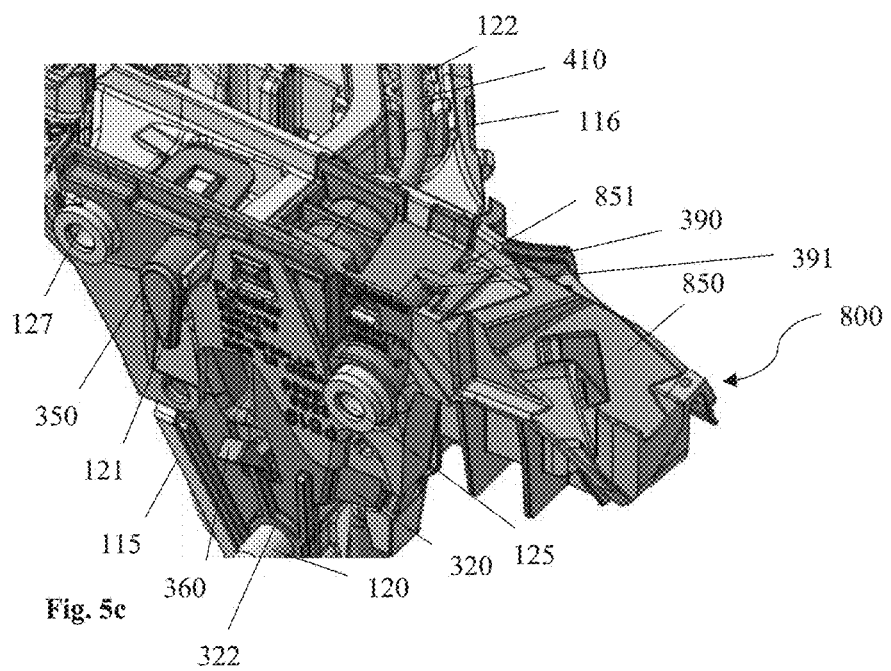
Figure 13A:
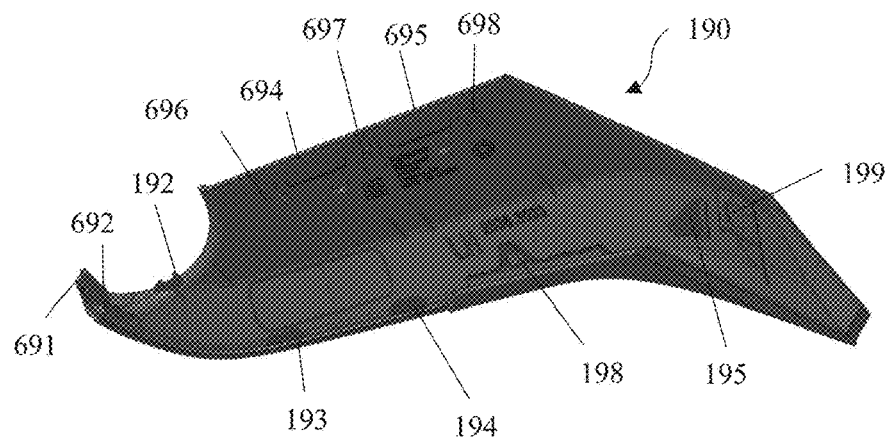
FIG. 13a is a perspective view of the upper base cover of FIG. 12e.
Figure 13B:
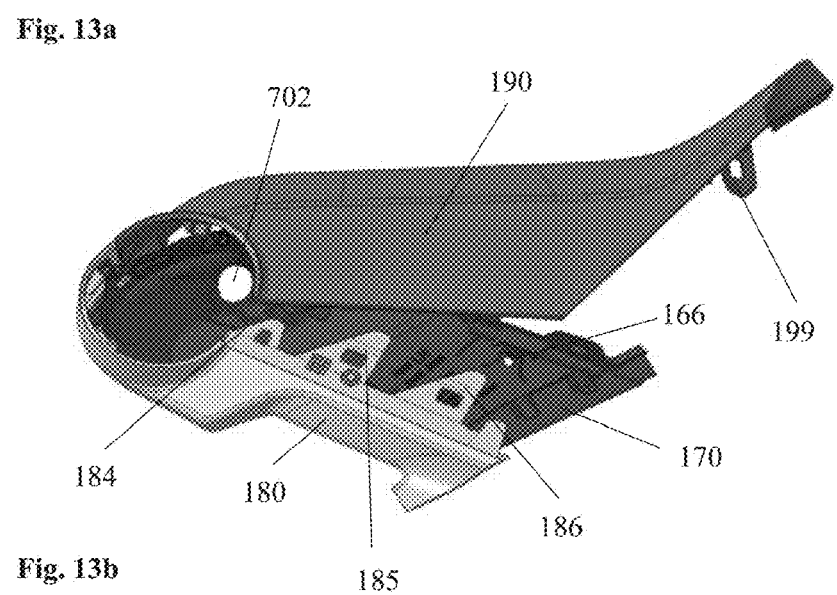
FIGS. 13b to 13i are perspective views demonstrating the attachment of the upper base cover of FIG. 13a with the lower base cover of FIG. 1a as well as the base cover cap of FIGS. 10a and 10b.
Figure 13C:
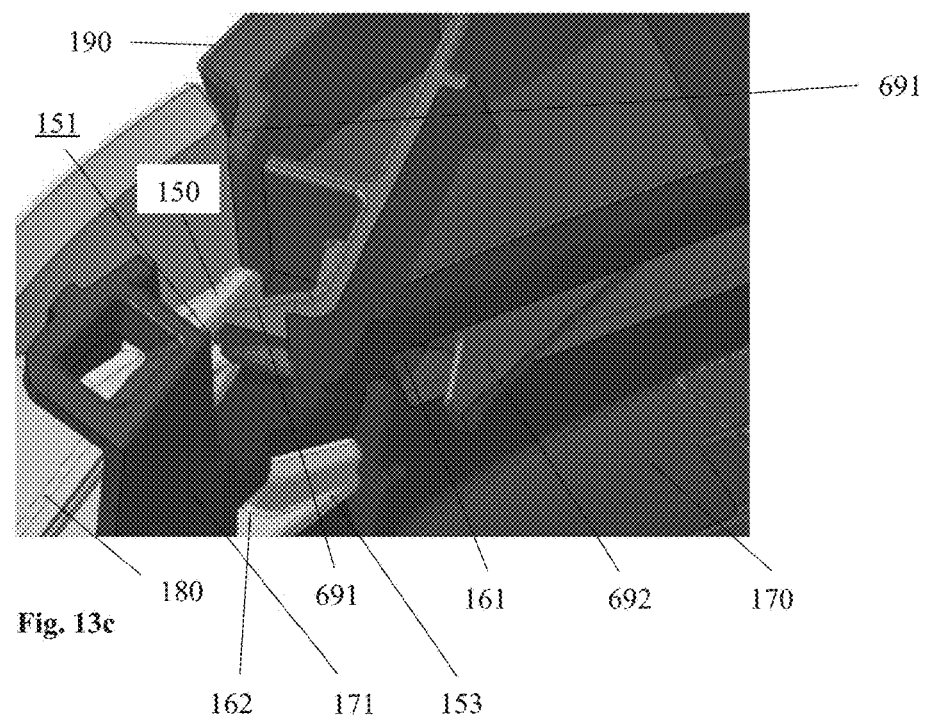
Figure 13D:
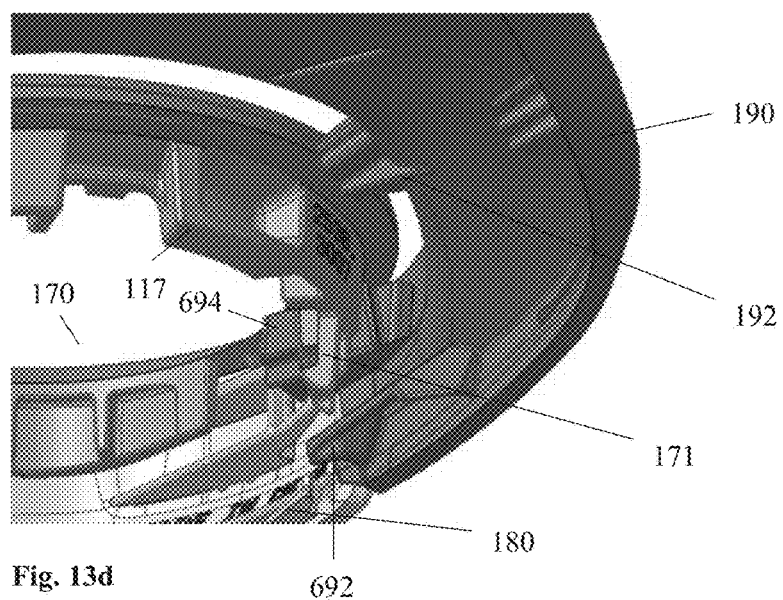
Figure 13E:
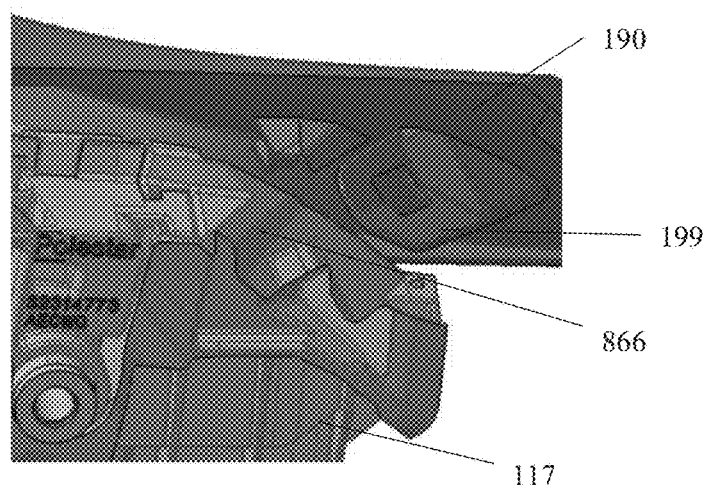
Figure 13F:
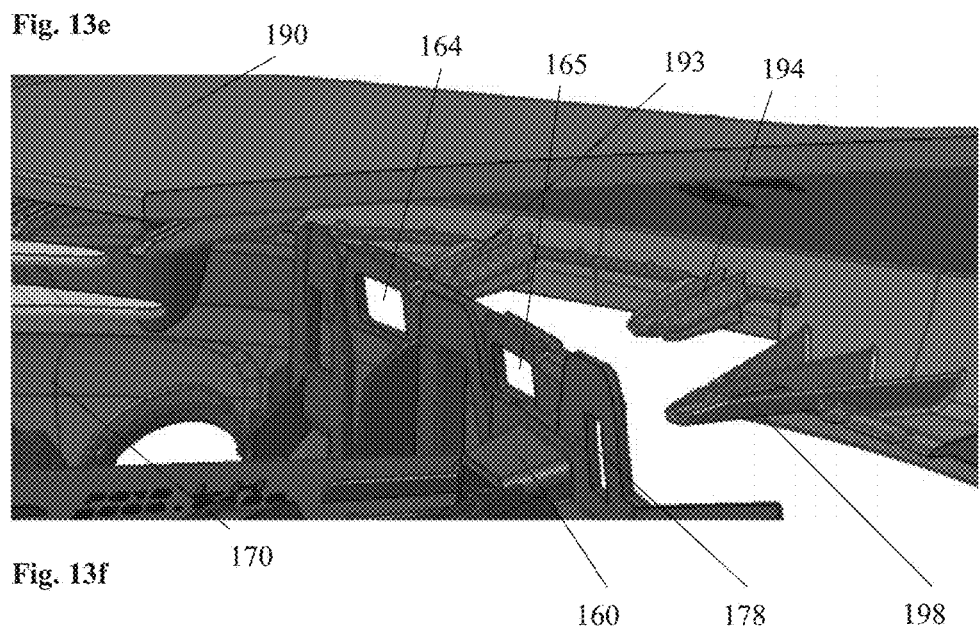
Figure 13G:
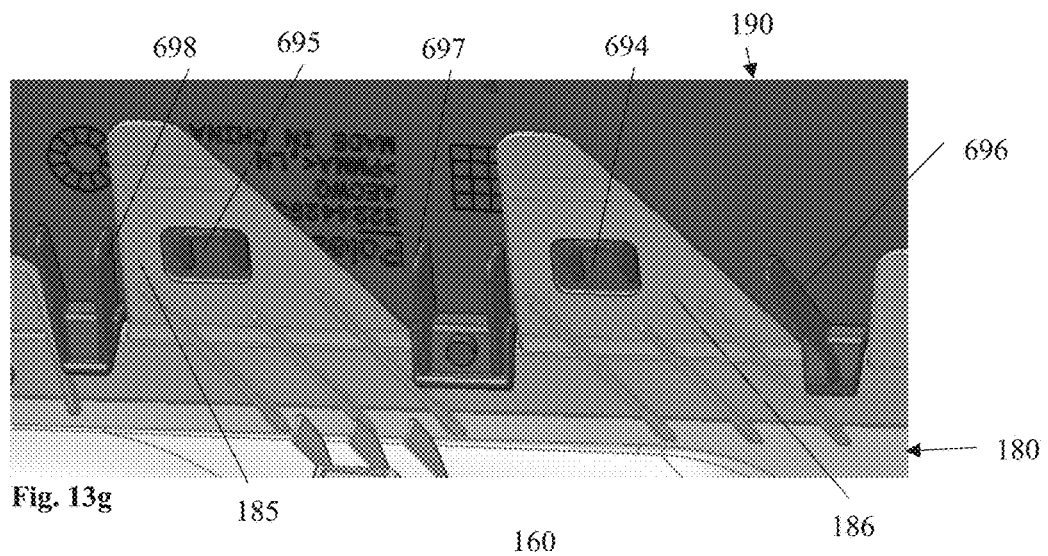
Figure 13H:
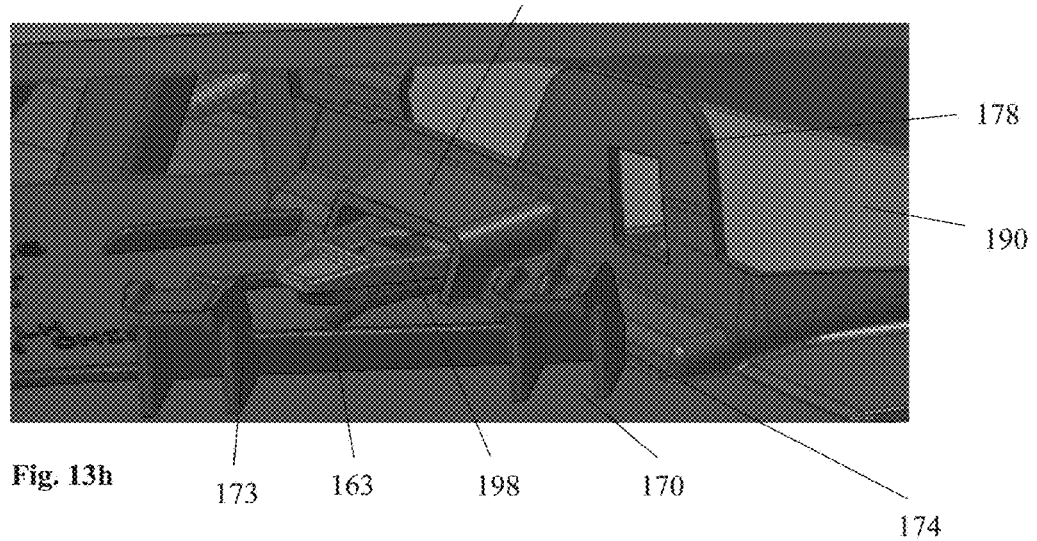
Figure 13I:
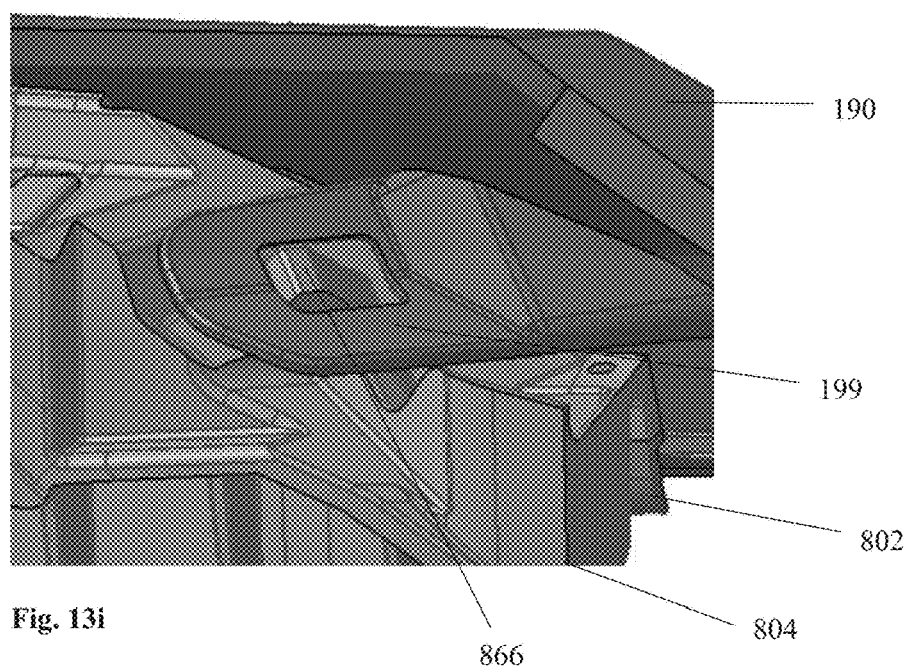

The sealing means 800 provides a datum area 850 for an upper base cover 190 as described with respect to FIG. 13i, with T-slots 391, 851 built into both the retainer means 301 and the sealing means 800, see FIG. 5c, to maximize and gain strength from the base frame into the area for upper base cover assembly.

Two screw positions determined by two screw openings 881 and 882 in the sealing means 800, best seen in FIG. 5a, and the two screw openings 131 and 132 of the base frame 110 shown in FIG. 3a, allow to secure the sealing means 800 together with the retainer means 301 to the base frame 110. These are package protections only if more strength is required.

Figure 6C:
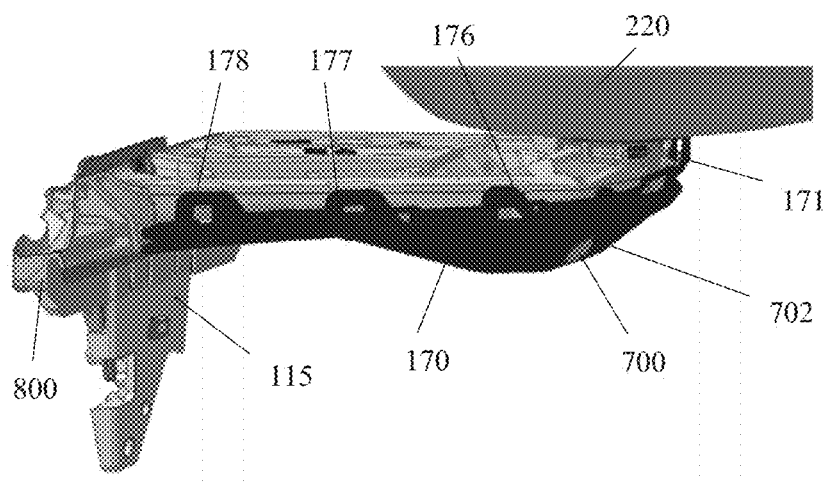

The assembly process of the lower base cover 170 to the sub-assembly of FIG. 4f is designed in such a way that the camera hole 702 in the lower base cover 170 avoids scratching or fowling the camera lens whilst rotating into final assembled condition, by first approaching the lower base cover 170 to the base frame 110 (FIG. 6a), then attaching the lower base cover 170 to the base frame 110 at the door attachments portion 115 (FIG. 6b), and finally rotating the lower base cover 170 on the arm 116 (FIG. 6c).

Figure 6D:
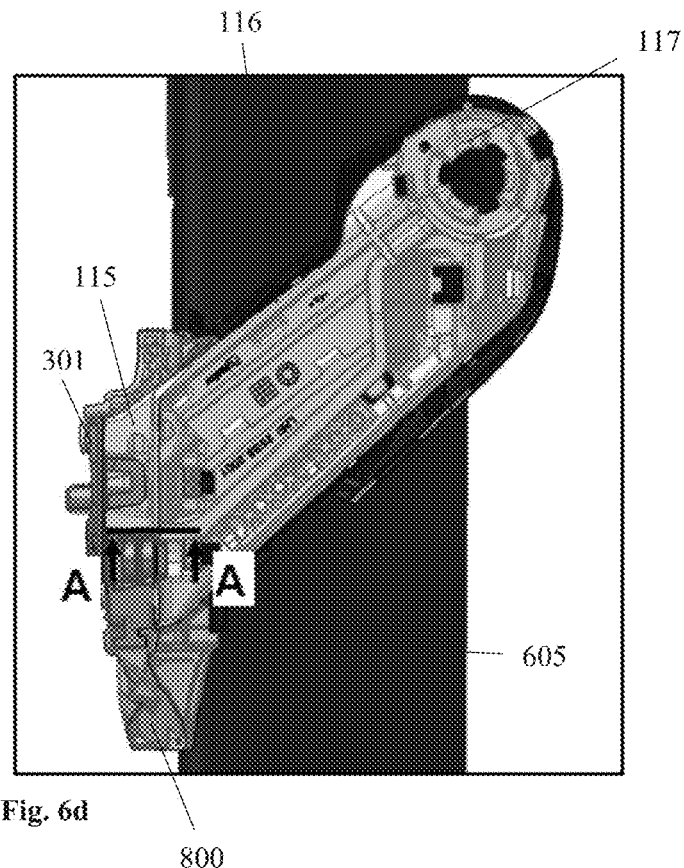
FIG. 6d is another view of the sub-assembly of FIG. 6c, attached to the door.
Figure 6E:
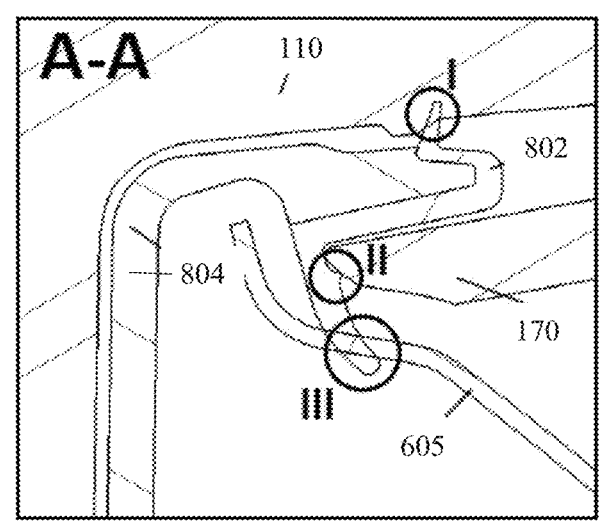
FIG. 6e is a cross-section taken along the line A-A of FIG. 6d.

The sub-assembly of the base frame 110, the retainer means 301, the sealing means 800 and the lower base cover 170 is shown in FIG. 6d, attached to the door panel 605. FIG. 6e shows a cross-section taken along the line A-A in FIG. 6d. From FIG. 6e the functions of the sealing means 800 as a 2K door gasket, including an integrated 2-way simultaneous sealing function as well as providing datum, location and positional controls for matching the lower base cover 170, can be best seen.

In detail, the 2-way simultaneous sealing is achieved due to the more or less S shape cross-sectional geometry of the door gasket seal 802, which may be a rubber part formed together with the door gasket substrate 802, to allow sealing in three areas with only one cavity in a 2K tool. The three sealing areas are marked with I, II and III in FIG. 6d:

sealing area I provides an inner sealing to the base frame 110, sealing area II provides an outer sealing to the lower base cover 170, and sealing area III provides an outer sealing to the door panel 605.

Figure 7A:
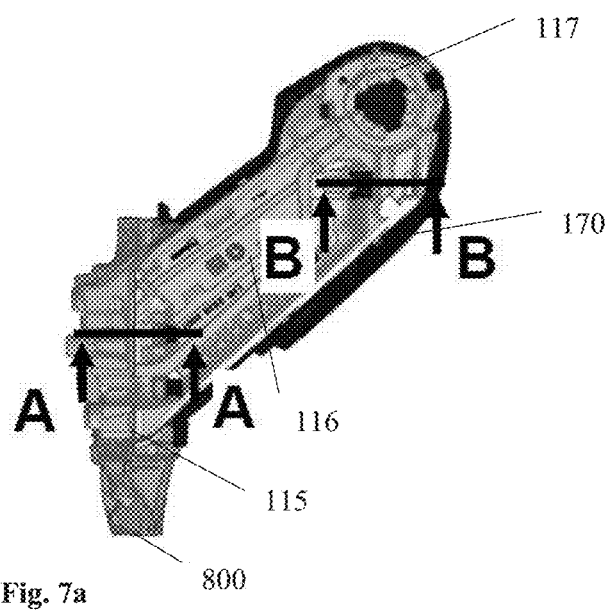
FIG. 7a is a top view on the sub-assembly of FIG. 6c.
Figure 7B:
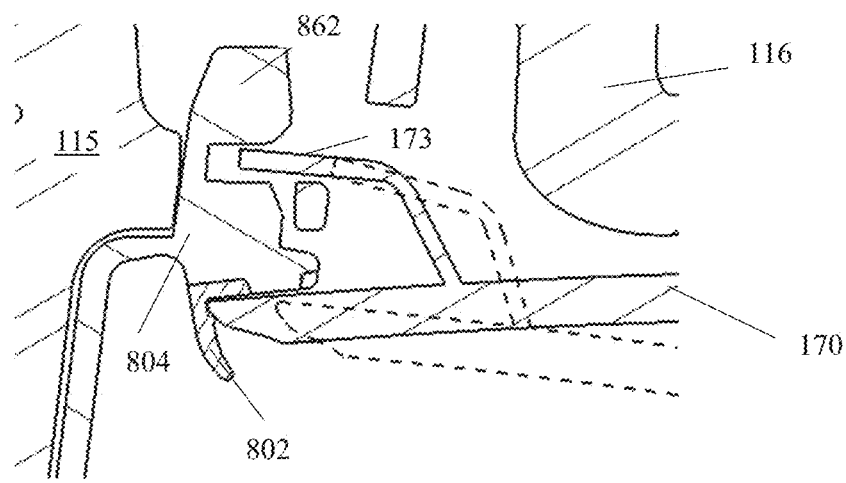
FIG. 7b is a cross-section of the sub-assembly of FIG. 7a taken along the line A-A.
Figure 7C:
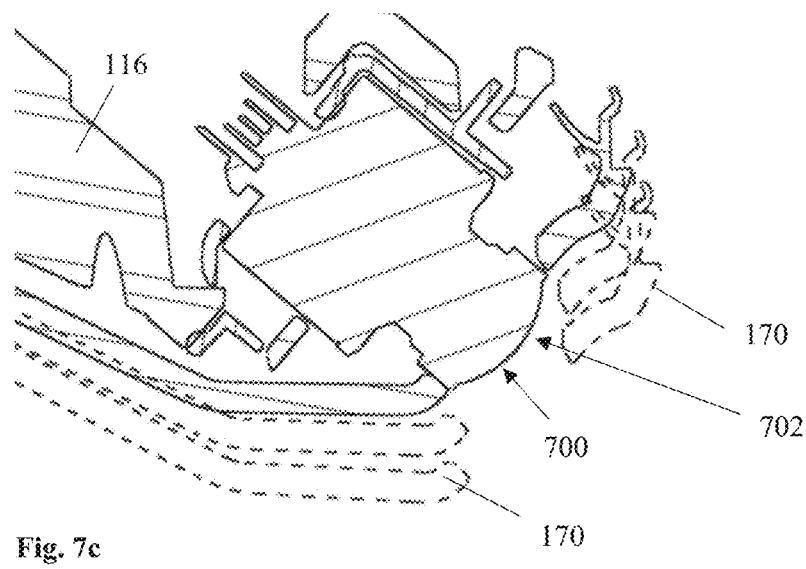
FIG. 7c is a cross-section of the sub-assembly of FIG. 7a taken along the line B-B.

The sealing means geometry between the exterior rear view device 1 and vehicle door 600 provides a tolerant and accurate sealing strategy when considering the assembly direction. The tolerance between door panel 605 and door datum system may be large as sealing lip of the door gasket seal 802 of the sealing means 800 accommodates for such variations The sub-assembly shown in FIG. 6d is also shown in FIG. 7a, whereas FIGS. 7b and 7c show details of the rotational attachment of the lower base cover 170, referred to above with respect to FIGS. 6a to 6c:

At the beginning, at the door attachments portion 115 in FIG. 7b, the edge of the lower base cover 170 engages the door gasket seal 802 such that the hook 173 can rotate into the hook pocket 862 provided by the door gasket substrate 804, and at the end, at the head attachments portion 117 in FIG. 7c, the camera hole 702 is embracing the camera 700.

The rotational attachment of the lower base cover 170 ensures that the camera, in particular its lens, remains untouched by the lower base cover 170.

FIGS. 8a to 8c illustrate a camera cradle 704 for assembling in the base frame 110 for holding the camera 700 securely within the base assembly 100 of the exterior rear view device 1. Thus, the camera 700 is installed in the base frame 110 using the camera cradle 704, as shown in FIG. 8a. The camera cradle 704 is symmetrical along at least one axis and no screws are needed to attach the camera cradle 704 to the base frame 110. Further the body of the camera 700 is protected from contacting the metallic base frame 110 as the camera cradle 740 is made out of a plastic material in order to isolate the camera housing. The camera cradle 704 as shown in FIG. 8c is a one-piece element which is preferably formed by a molding process.

The camera cradle 704 include one or more location ribs 742 inside the interior surface of the cradle 704 which hold the camera 700 securely in place to provide an accurate and tuneable positioning of the camera along the X, Y, and Z axes. In the example shown in FIG. 8c, the location ribs 742 include six ribs formed as two pairs of ribs on three interior walls of the camera cradle 704; however, any number of ribs 742 may be used.

It can be seen in FIGS. 8b and 8c that the camera cradle 704 also includes one or more anti-backout projections 746 and one or more clips 744. The anti-backout projections 746 are frictionally fit into the walls of the base frame 110 when the cradle 740 is inserted. When the walls of the base frame 110 push against the projections 746 and the cradle 704 is inserted, this also "locks" the clips 744 to tighten the attachment of the camera 700 to the camera cradle 704.

In the shown example, there are two anti-backout projections 746 and two clips 744 which are formed closer to a bottom edge of the cradle 704, i.e. the edge of the cradle 704 closer to the camera lens. However, any number of anti-backout projections 746 and clips 744 may be used in a variety of different positions. This ensures a tight lock of the camera 700 and stops the camera body from contacting the base frame 110.

Figure 9A:
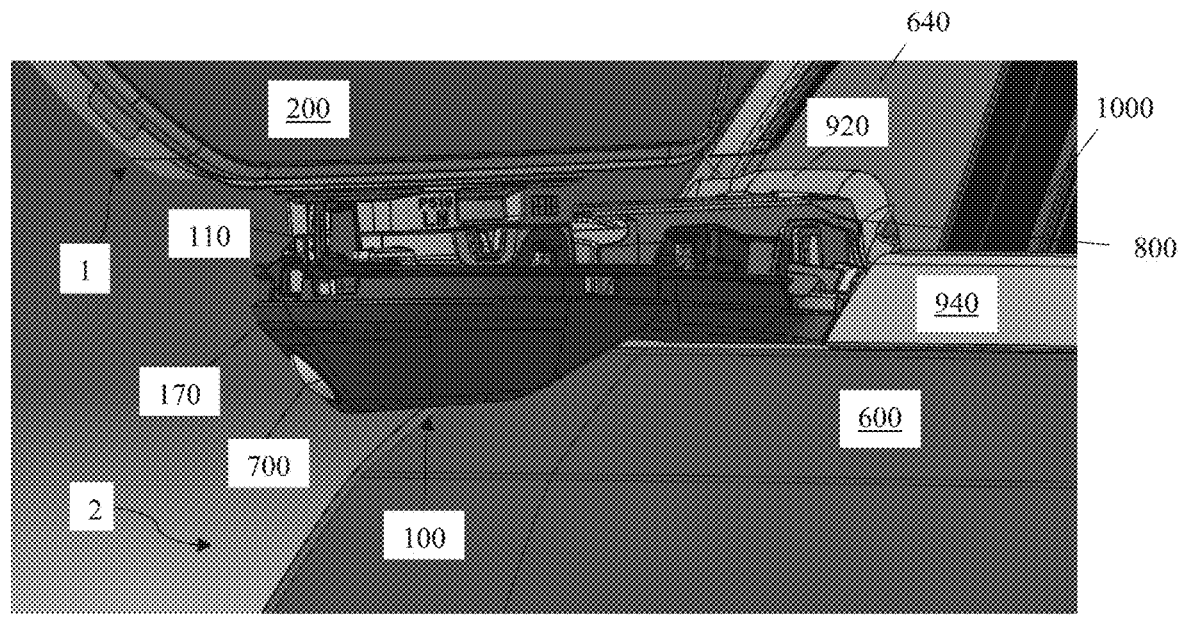
FIG. 9a is a perspective view of the sub-assembly of FIG. 7a attached to the vehicle.
Figure 9B:
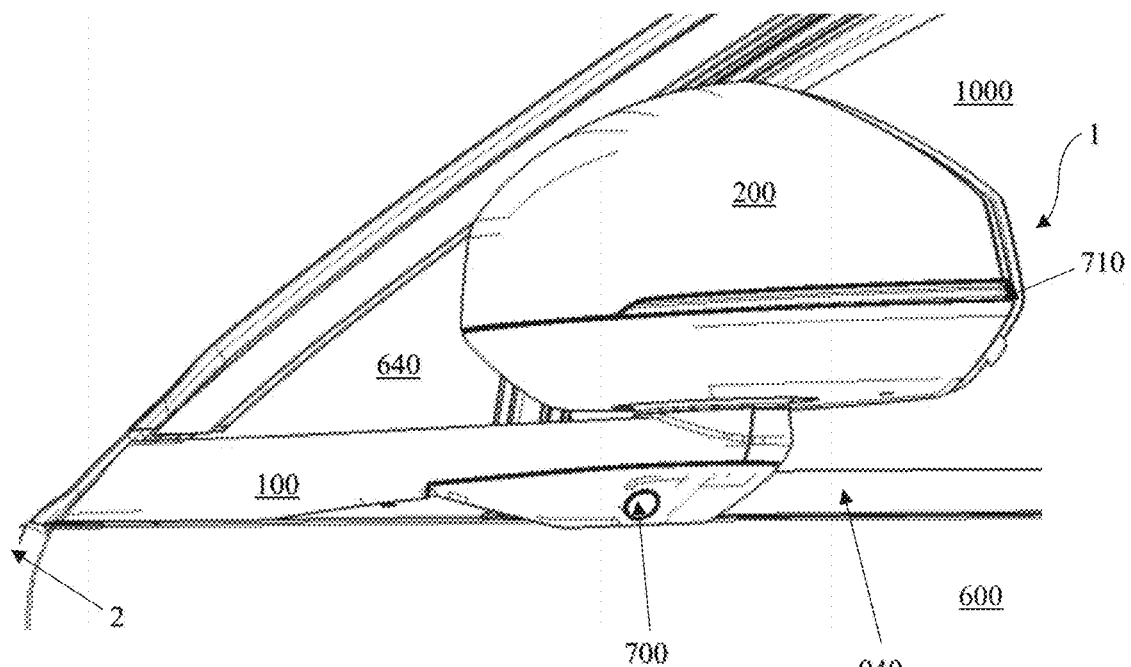
FIG. 9b is a perspective view of an exterior rear view device of the present disclosure and attached to a vehicle of the present disclosure.

The sub-assembly of FIG. 6c is also shown in FIG. 9a, but mounted to the vehicle 2 and with the completed head assembly 200 attached, as well as from another perspective. FIG. 9a shows further details of the vehicle 2 in the region of the door 600, namely a cheater panel 640 as well as a window 1000, with a glass run seal 920 as well as a waist finisher 940. In FIG. 9b the final rear view device 1 attached to the vehicle 2 can be seen. Accordingly, the exterior rear view device 1 holds the glass run seal 920 in a solid position and, thereby, provides a very pleasing overall appearance suggesting that the exterior rear view device 1 extends or rather grows out of the waist finisher 940 covering a part of the glass run seal 920.

Figure 10A:
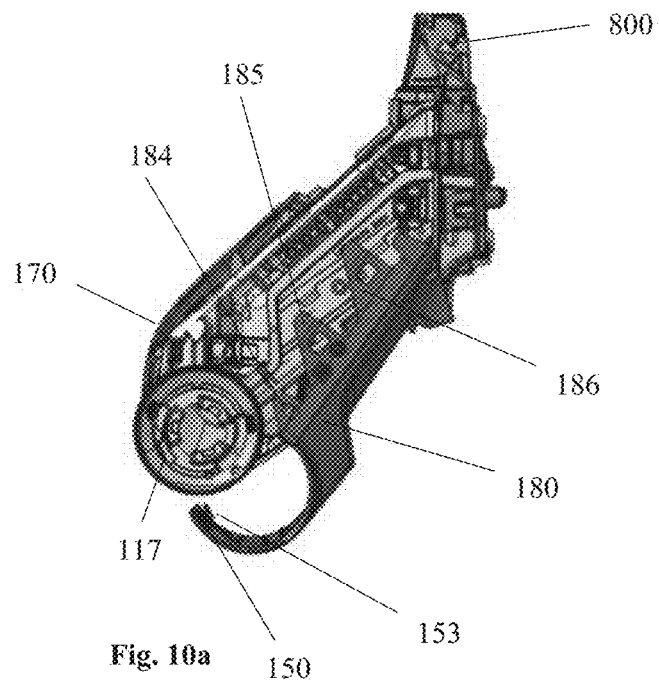
Figure 10B:
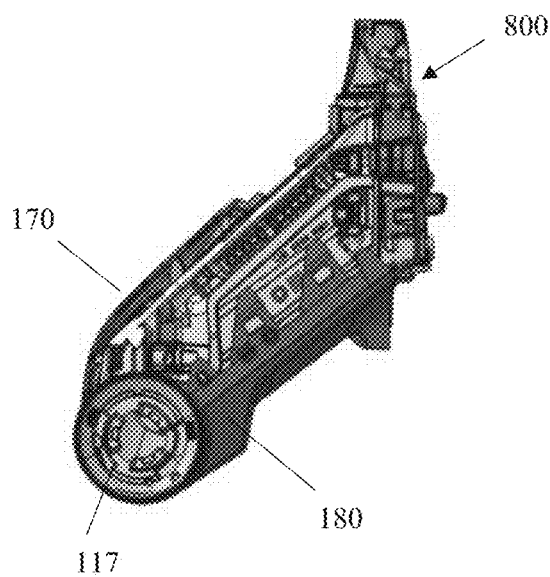

In the following it is described how to finalize the exterior rear view device 1. Next, starting from the sub-assembly of FIG. 7a, the assembly of a base cover cap 180, being another one of the three cover pieces of the base frame 110 and being formed with projections 150, 153 and clips 184, 185 and 186 is described with respect to FIGS. 10a and 10b. Said assembly process of the base cover cap 180 is designed in such a way that the base cover cap 180 slides in along a ramp on the lower base cover 170 to lock in behind the base cover cap 180 creating a rotation point to rotate the base cover cap 180 into its final position.

Said sliding will be discussed in further detail with respect to FIGS. 14a to 14c. But next, in order to better understand the assembly of the base cover cap 180 as part of the base cover, FIGS. 11a to 11e illustrate its attachment step by step, by starting in FIG. 11a with a part view of the sub-assembly of FIG. 7a attached to the door panel in order to be arranged next to the glass run seal 920, and showing attachment features of the base cover cap 180 in FIG. 11b. Accordingly, the base cover cap 180 is provided with a tab 152 in addition to the clips 184 to 186.

Figure 11A:
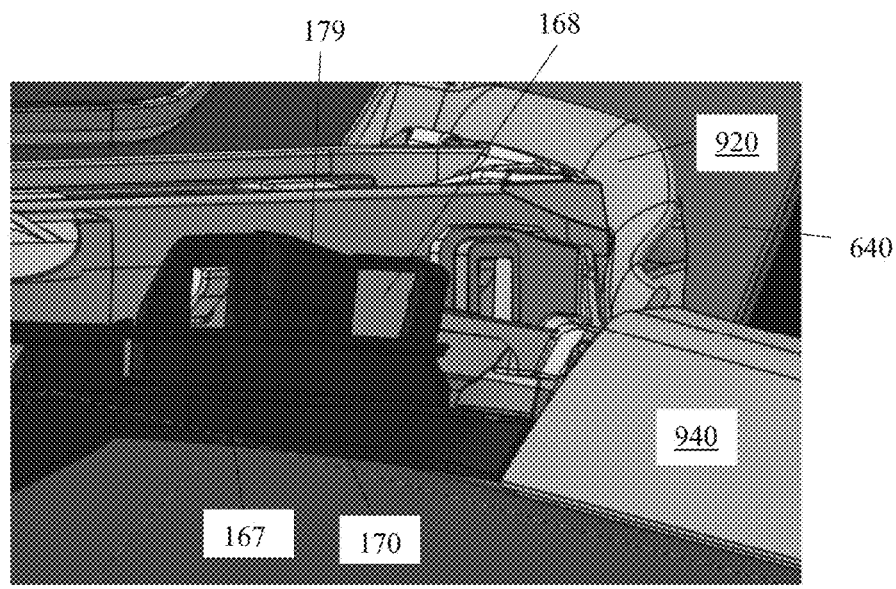
FIGS. 11a to 11e are perspective part views of the lower base cover of FIG. 1a, the base cover cap shown in FIGS. 10a and 10b and an upper base cover, demonstrating the attachment of those 3 cover pieces to each other.
Figure 11B:
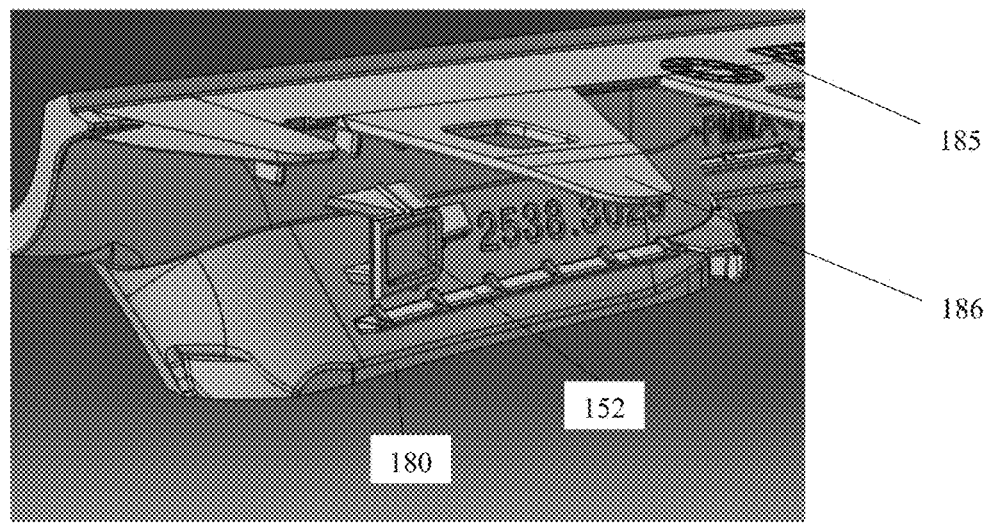
Figure 11C:
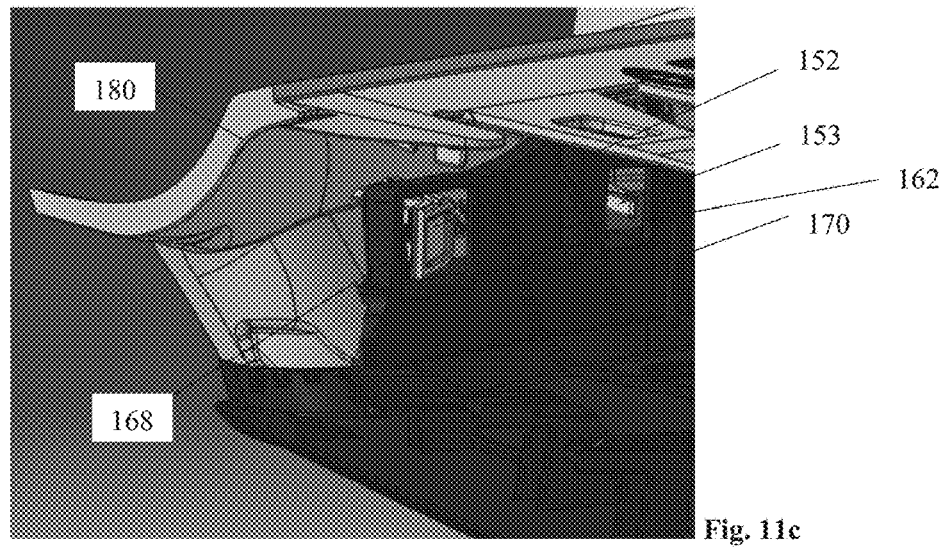

The tab 152 of the base cover cap 180 is to be entered into an opening 168 of the lower base cover 170 provided on one side of the clip 179, shown in FIG. 1a. Said tab 152 defines the attachment direction and locks in behind the lower base cover 170, as illustrated in FIG. 11c, for creating said rotation point.

Figure 11D:
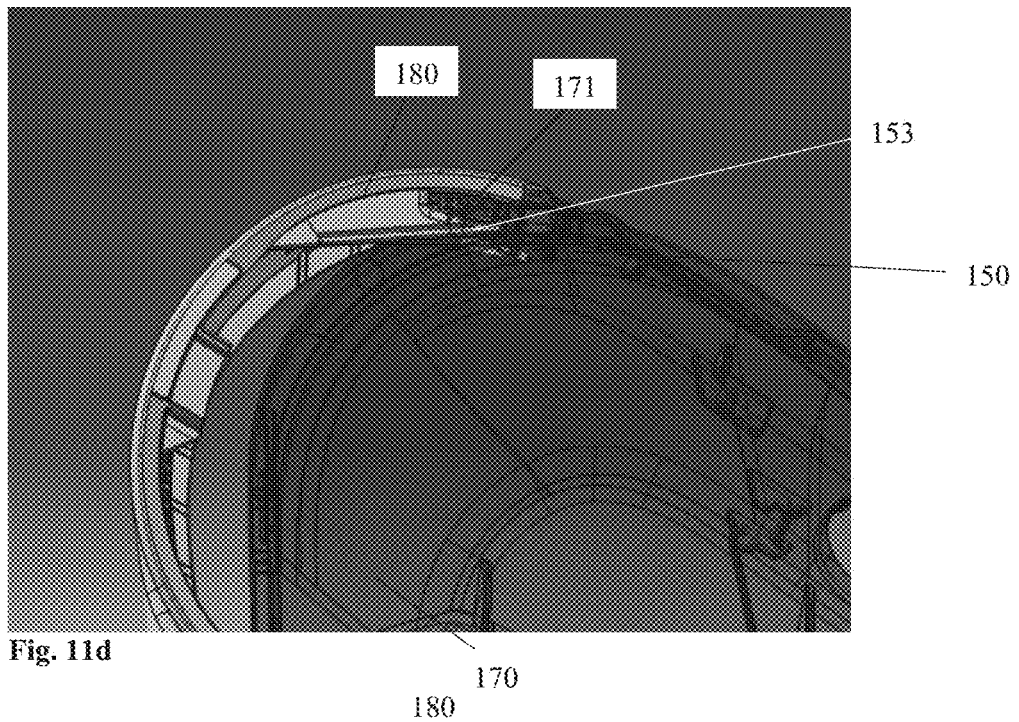

The next step is to rotate the base cover cap 180 into final position. The rotation has been created such that no surrounding parts are scratched, by the outboard area of the base cover cap 180 being forced to flex outboard while rotating, as indicated in FIG. 11d.

Figure 11E:
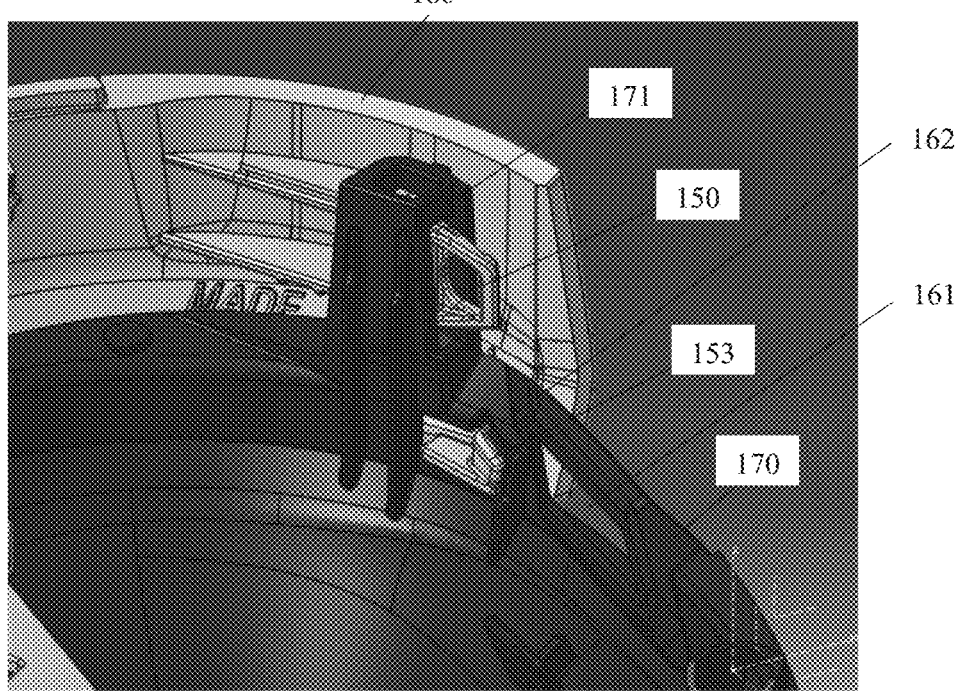

FIG. 11e shows the peg type projection 150 of the base cover cap 180 entering into a slot in the multi-functional assembly projection 171 of the lower base cover 170, while the other peg type projection 153 of the base cover cap 180 enters into another slot in the multi-functional assembly projection 171 of the lower base cover 170 as well as flexing back into the opening 161 of the lower base cover 170 for controlling the final fit of the base cover cap 180.

Figure 12A:
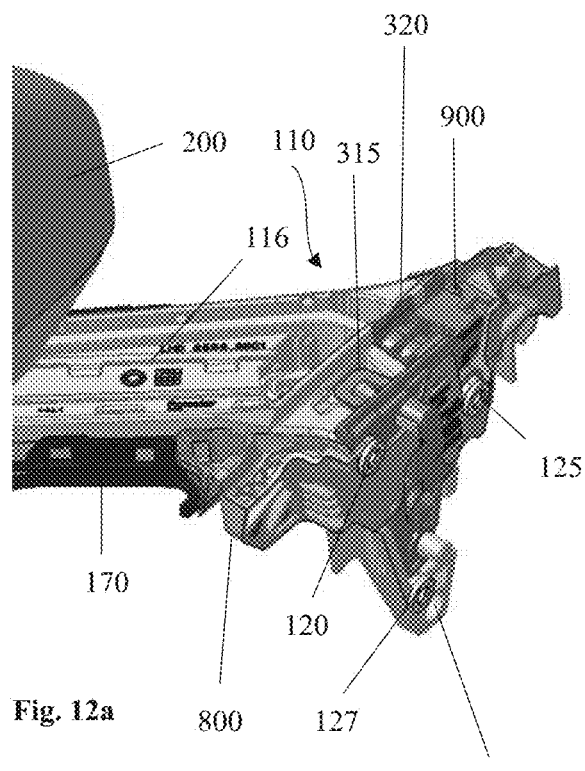
FIGS. 12a to 12f are perspective views demonstrating the assembly of a glass run seal, a cheater panel, the base frame, an base cap and the upper base cover with respect to the door panel and a window.
Figure 12B:
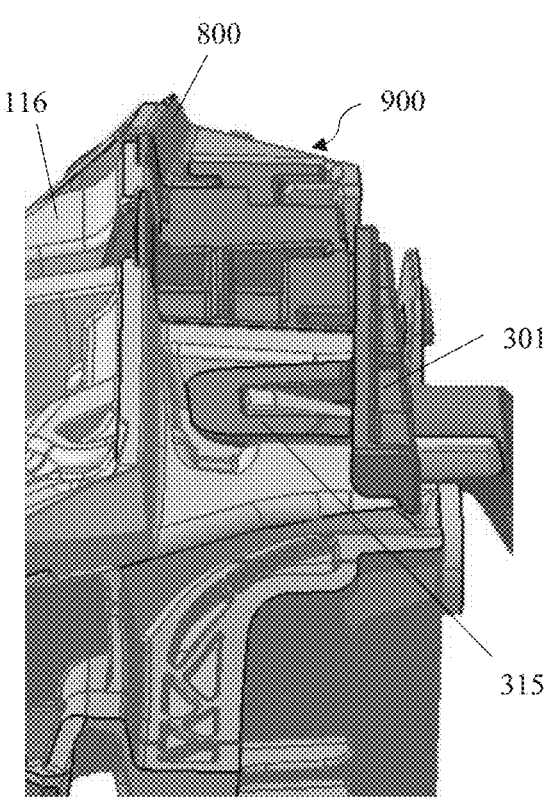
Figure 12C:
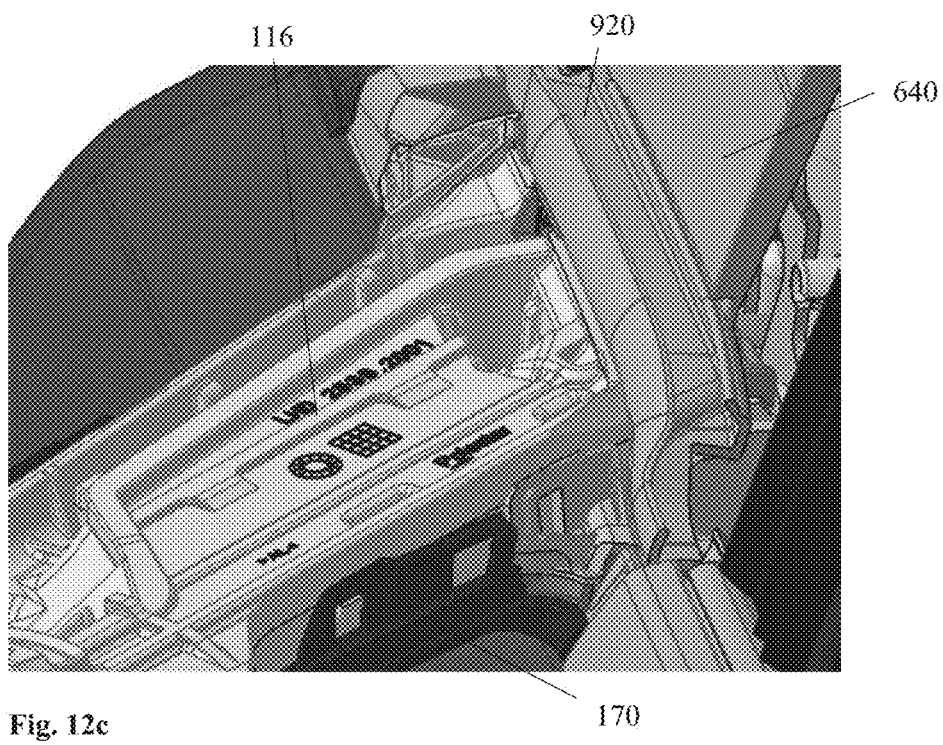

The sub-assembly of the base frame 110, the retainer means 301 and the sealing means 800 shown in FIG. 7a also forms a channel 900, see FIGS. 12a and 12b, for positioning as well as locating the glass run seal 920 in particular allocated to the cheater panel 640 as shown e.g. in FIG. 12c.

In the following the attachment of the base cover cap 180 and the base cover upper or upper base cover 190 are described with reference to FIGS. 12d to 12f.

The combination the base frame 110, the retainer means 301 and the sealing means 800 forms the channel 900 which locates the glass run seal 920 on to the exterior rear view device 1. The glass run seal 920 runs along the cheater panel 640 and is an extension of the glass run seal running along the window 1000 and being covered by the waist finisher 940 as shown in FIGS. 9b, 12c and 12d.

Figure 12D:
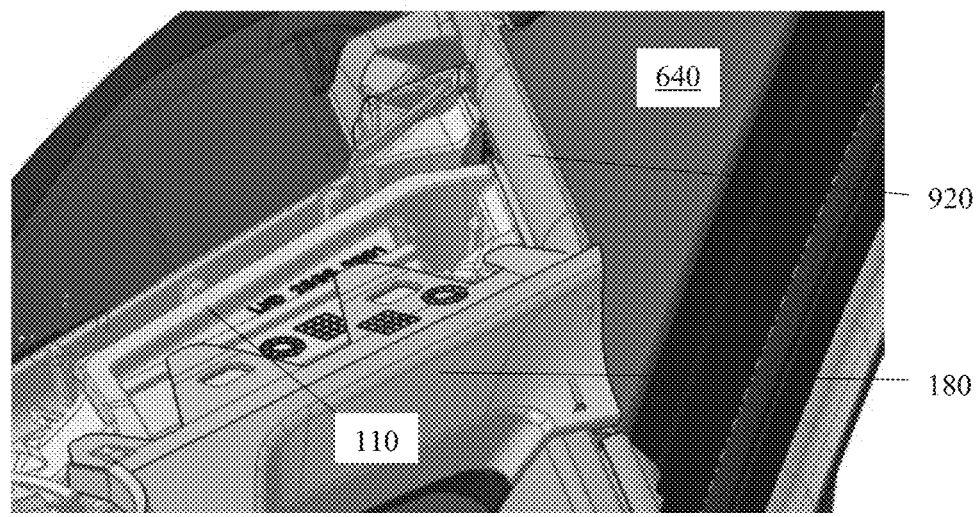
Figure 12E:
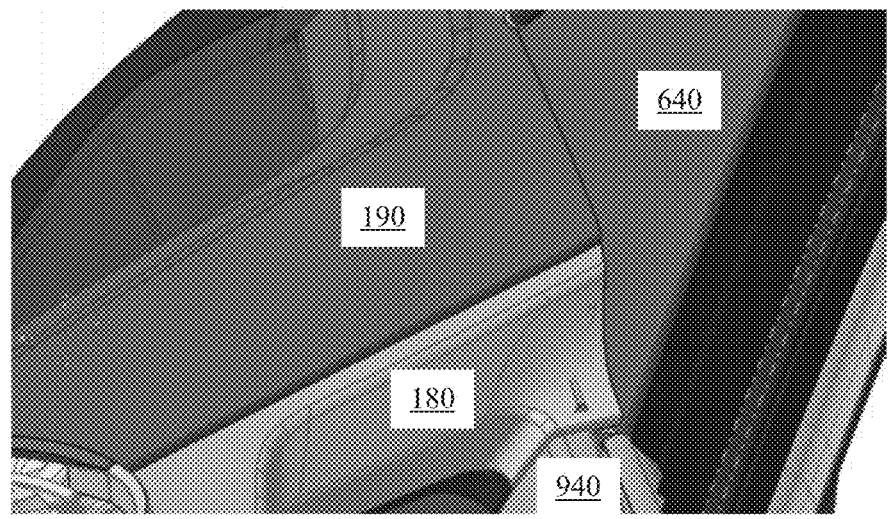
Figure 12F:
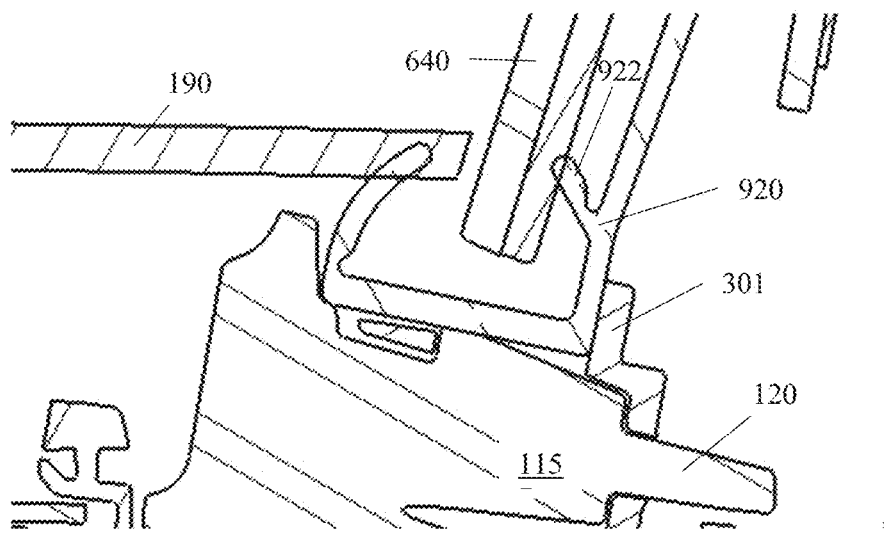

The base cover cap 180 clips to the base frame 110, see FIG. 12d, and also the upper base cover 190, providing the last and third cover piece of the base frame 110, is attached by clip connection, see FIG. 12e. The clip connection may be located behind a chrome waist finisher (not shown) and will be described below with respect to FIGS. 13a to 13i.

The cheater panel 640 pushes the glass run seal 920 into the correct position inside the channel 900 while being assembled. The base cover 180 and the upper base cover 190 assemble in such a way that when rotating into their position a sealing lip 922 of the glass run seal 920 is pushed against the cheater panel 640 sealing the gap between the base cover cap 180 and the upper base cover 190 on the one side and the cheater panel 640 on the other side, see FIG. 12f.

FIGS. 13a to 13i illustrate details of the attachment of the upper base cover 190 with the lower base cover 170 and the base cover cap 180 to assemble the cover of the base frame 110. For that purpose, FIG. 13a shows the different attachment features of the upper base cover 190 with four location projections 192 to 195, a clip 198, a hoop clip 199, two location pegs 691, 692, two clip retention extensions 694 and 695 as well as three aligns projections 696 to 698.

To assemble the upper base cover 190, the two location pegs 691 and 692 need to be fitted into two corresponding slots, one being provided by the opening 162 in lower base cover 170 and the other by a slot 151 being formed in the projection 150 of the base cover cap 180, see FIG. 13c. The peg 691 pulls the base cover cap 180 into the final position and defines the rotation axis for the components. Rotating the components results in engagement of the four location projections 192 to 194 and 198 to position the upper base cover 190, see FIGS. 13d to 13f.

Three alignment features are provided by the upper base cover 190 in form of the projections 696 to 698 to align and lead two clip retention features in form of the clip retention extensions 694 and 695 onto the corresponding clips 185 and 186 of the base cover cap 180, see FIG. 13g.

The bottom clip 198 of the upper base cover 190 goes into the pocket 160 in the lower base cover 170 and locates the bottom parts of the components 190 and 170, as shown in FIG. 13h.

The last cover engagement feature is the hoop clip 199 of the upper base cover 190 which is shown in FIG. 13i and secures the whole assembly by engaging the projection 866 of the door gasket substrate 804.

Accordingly, the sealing means 800 plays a central role due to in particular including integrated two way simultaneous sealing function with three sealing areas, i.e. the sealing area I providing an inner sealing to the base frame 110, the sealing area II providing an outer sealing to the lower base cover 170, and the sealing area II providing an outer sealing to the door panel 605;

having a geometry which permits the case lower 220 of the head assembly 200 to be assembled over the base frame 110, providing a datum area 850 with a T section support structure for the upper base cover 190 permitting simple clip together assembly, allowing a locking system, no screw assembly, of the lower base cover 170 rotating over the camera 700, and providing the channel 900 for the glass run seal 920 together with the base frame 110 and the retainer means 301, with said channel 900 allowing to position and locate the glass run seal 920, such that the exterior rear view device 1 holds the glass run seal 920 in a solid position and, thereby, provides a very pleasing overall appearance suggesting that the exterior rear view device 1 extends or rather grows out of the waist finisher 940 covering part of the glass run seal 920.

Figure 14A:
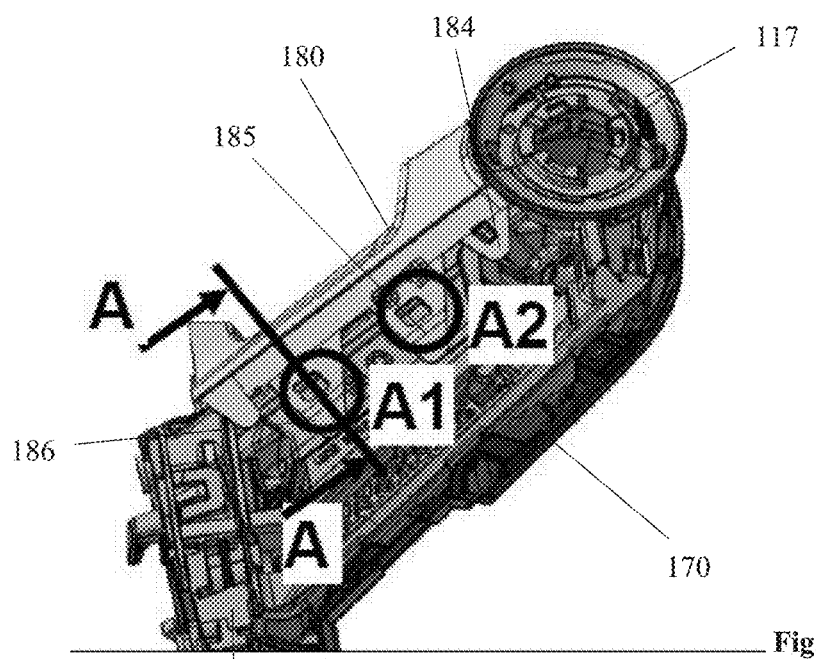
FIG. 14a is a perspective view of the base assembly, without the upper base cover.
Figure 14B:
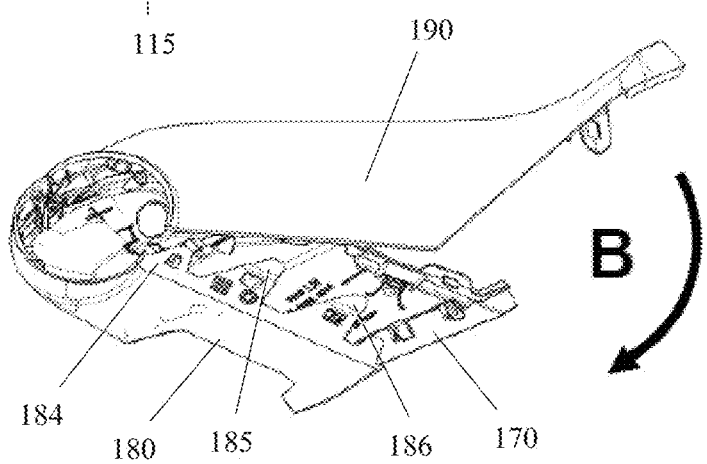
FIG. 14b is a perspective view demonstrating the attachment of the upper base cover, without the base frame.
Figure 14C:
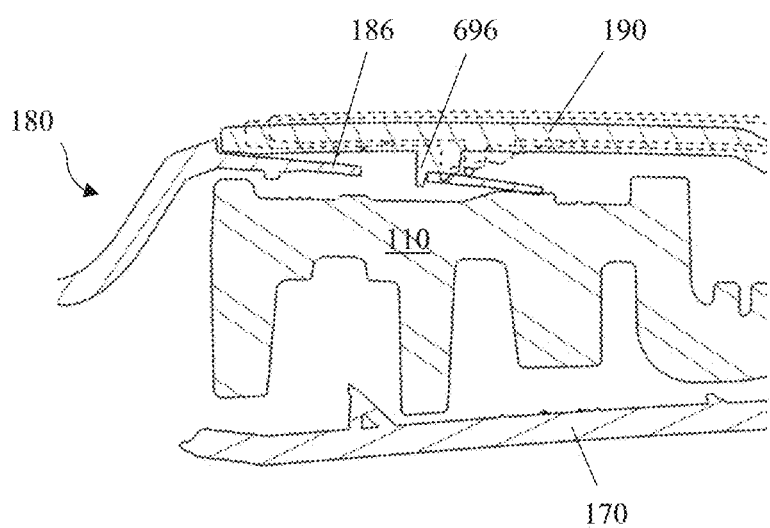
FIG. 14c is a cross-sectional view along the line A-A of FIG. 14a, with attached upper base cover.

FIGS. 14a to 14c demonstrate the attachment of the upper base cover 190 assisted by the base cover cap 180 while being assembled to the base frame 110 by providing a ramp guiding the rotational movement of the upper base cover 190. The ramp is provided by the two clips 185 and 186 the base cover cap 180 which also fulfill location and clips functions, simultaneously. Said clips 185 and 186 are arranged closer to the door attachment portion 115 of the base frame 110 than the third clip 184. The two integrated leaf spring features provided by the clips 185 and 186, acting on the base frame 110, align and pre load the cover assembly.

As best seen in FIG. 14c, the base cover cap leaf spring clips 185 and 186 rest on the base frame 110 at the root and end of each clip 185 and 186, allowing the middle portion of each clip 185 and 186 to flex downwards. Such a downward flex of the leaf spring clips 185 and 186 allows the upper base cover 190 to assemble and clip into position by rotating in the direction of the arrow B in FIG. 14*b*. The leaf spring interface with the upper base cover 190 allows pre load and tolerant fit of the three cover pieces 170, 180 and 190.

With respect to the FIGS. 15*a* to 17*c* the realization of the camera service requirement is described.

Figure 15A:
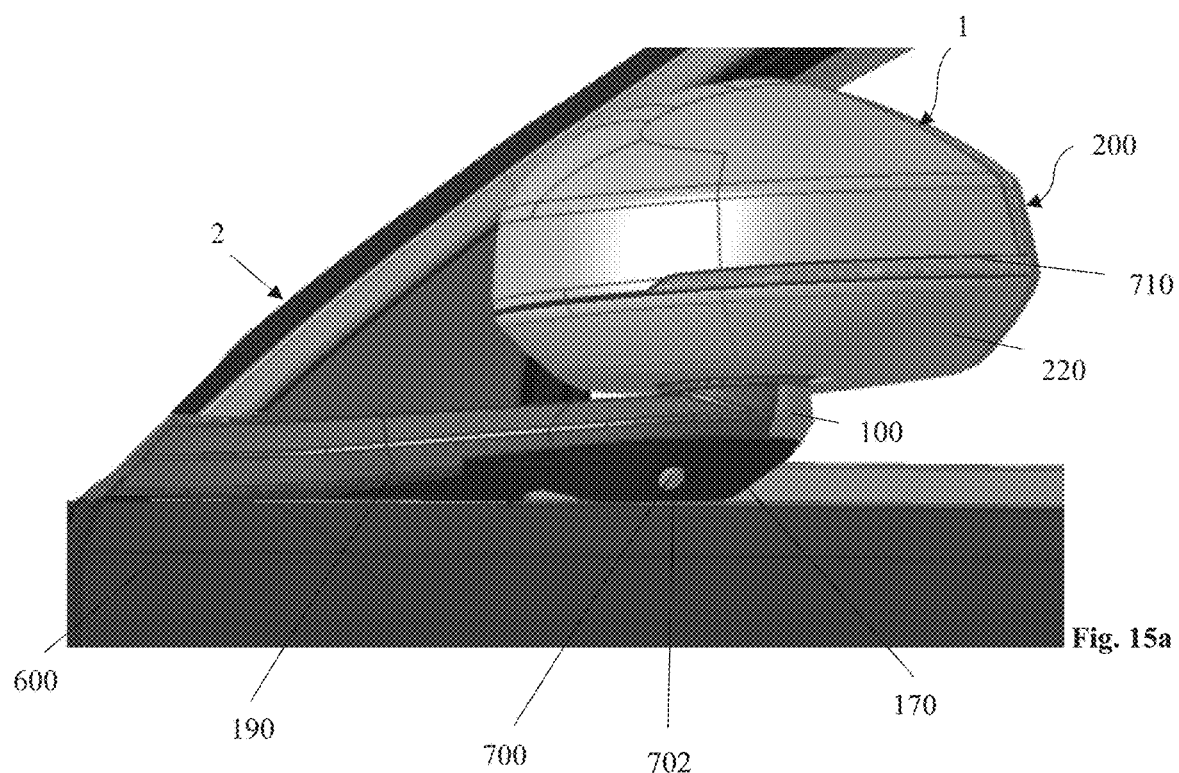
FIGS. 15a to 15f are perspective views demonstrating the dis-assembly of the 3 cover pieces for the camera repair.

In FIG. 15*a* the assembled exterior rear view device 1 mounted to the vehicle 2 is shown. To access the camera 700, all the three cover pieces are easily removable while the exterior rear view device 1 remains mounted to the door 600, see FIGS. 15*b* to 15*f*.

Figure 15B:
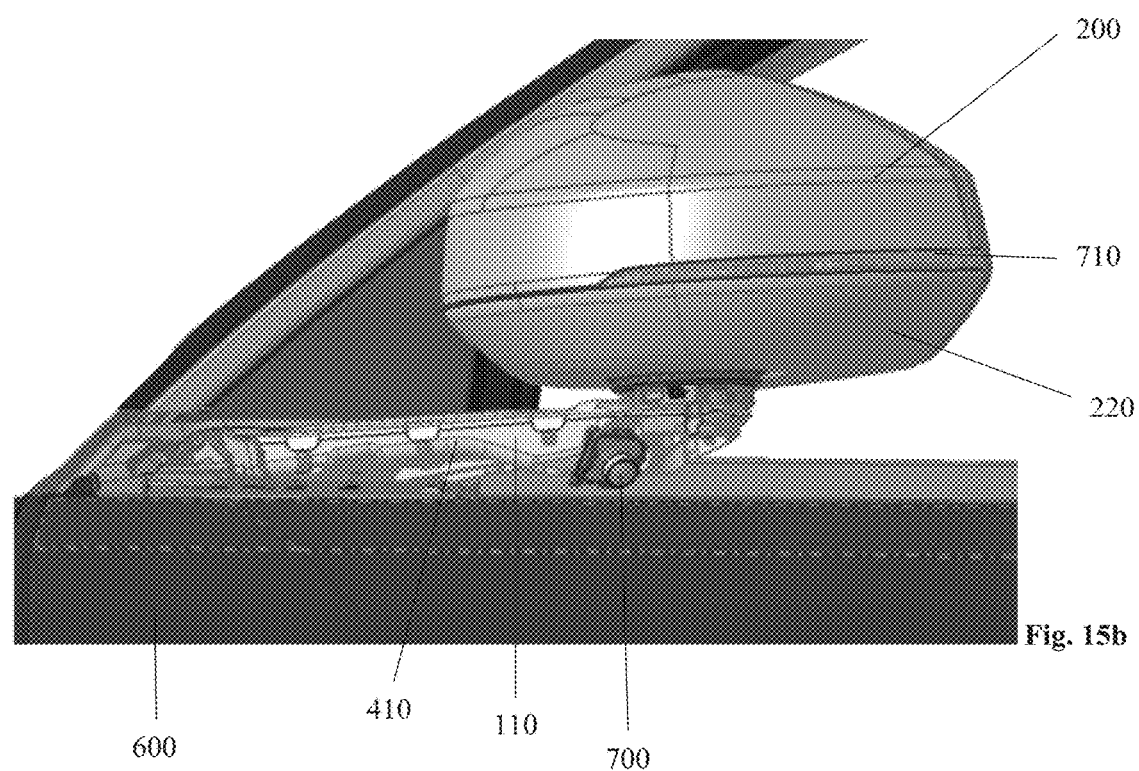
Figure 15C:
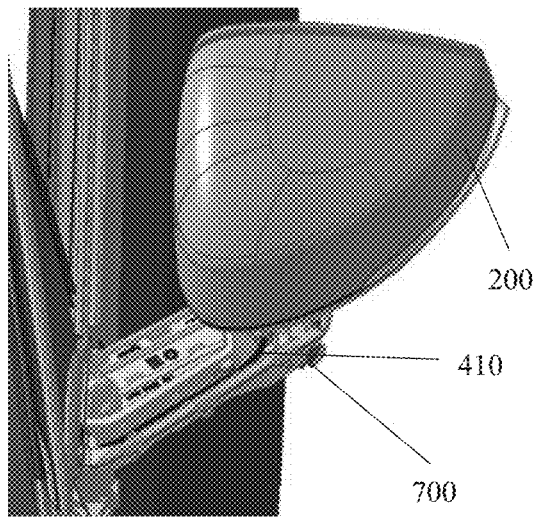
Figure 15E:
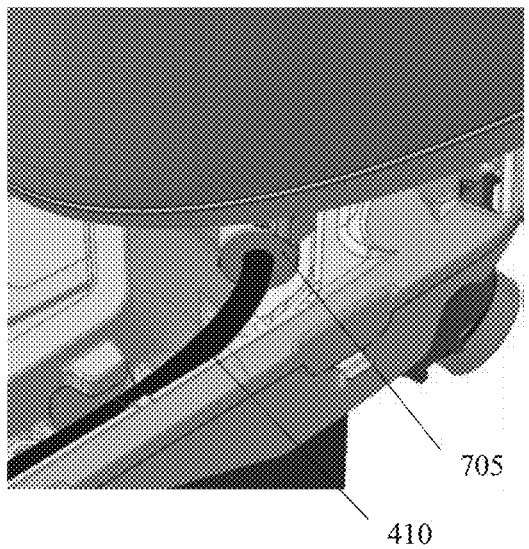
Figure 15D:
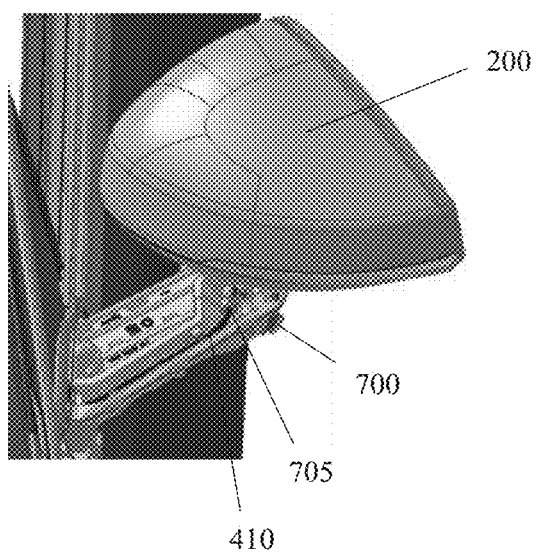
Figure 15F:
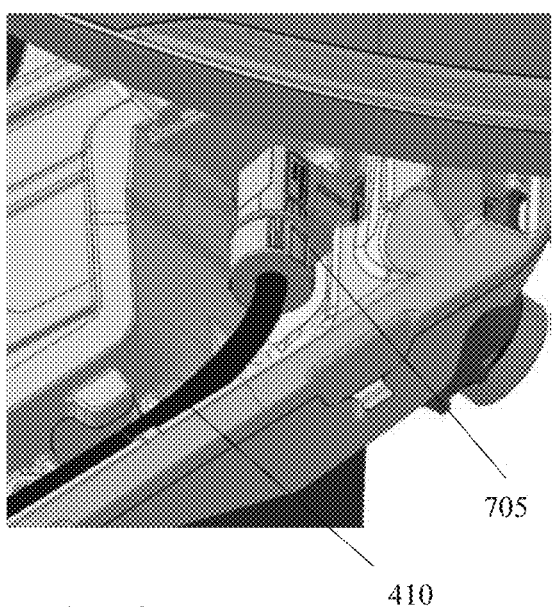

To gain access to a camera connector 705 at the end of the camera harness 410, the head assembly 200 must be set into a knock forward position and locked into place so two hands can be used to remove the camera 700 and its connector 705, with FIGS. 15*c* and 15*b* demonstrating the rotation of the head assembly 200 into said knock forward position, and details of the camera connector access is shown in the enlarged illustrations of FIGS. 15*e* and 15*f* of parts of FIGS. 15*c* and 15*d*, respectively.

Figure 16B:
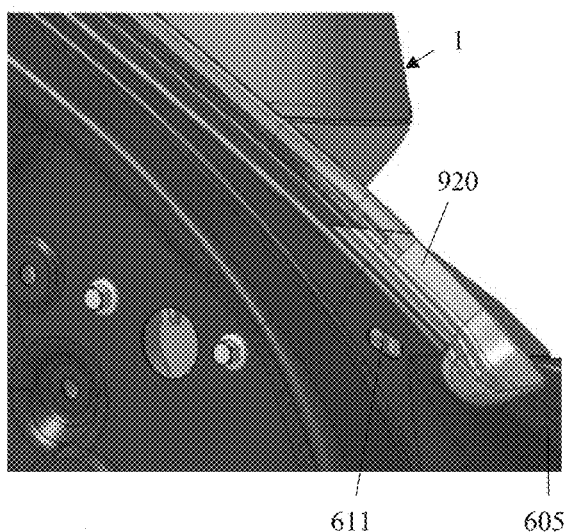
Figure 16C:
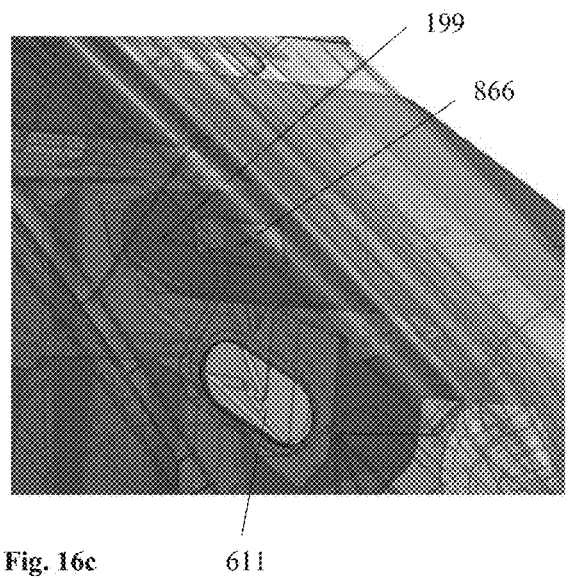

To dis-assemble all three cover pieces 170, 180 and 190 only one tool is needed for dis-lodging or dis-engaging clip connections, as explained in the following with respect to FIGS. 16*a* to 16*l*. In FIG. 16*a* the assembled exterior rear view device 1 mounted to the vehicle 2 is shown, in another perspective compared to FIG. 15*a* and the following five steps as required for the dis-assembly:

In a first step, the hoop clip 199 shown in FIG. 13*i* is accessed through a slot 611 in the door panel 605 to loosen the engagement with the projection 866 of the door gasket substrate 804, see FIGS. 16*b* and 16*c*

Figure 16D:
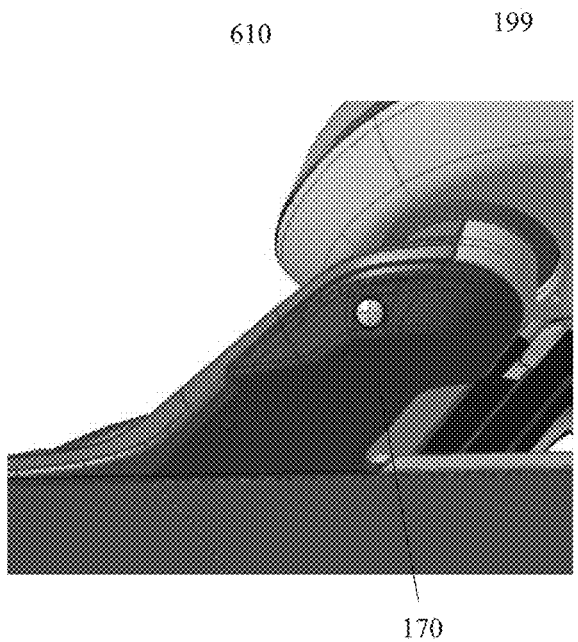
Figure 16E:
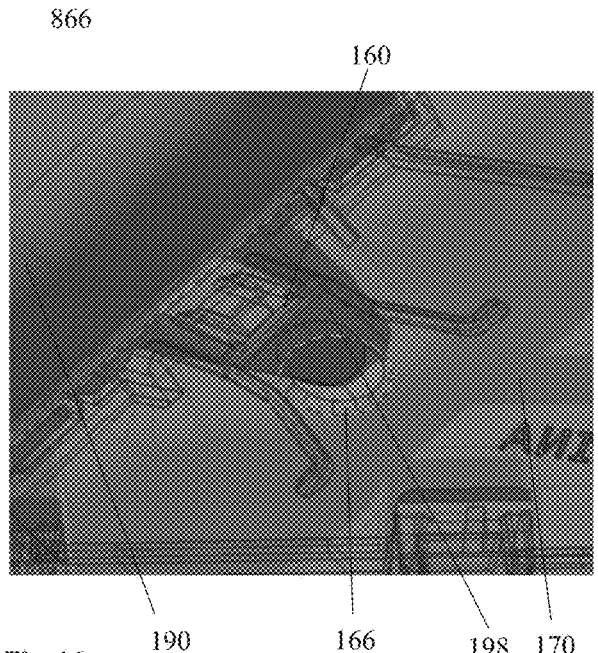

In a second step, shown in FIGS. 16*d* and 16*e*, the clip 198 of the upper base cover 190 engaging the pocket 16 of the lower base cover 170, see FIG. 13*h*, is loosen by passing through the drain hole 166 located in the lower base cover 170, with the drain hole 166.

Figure 16F:
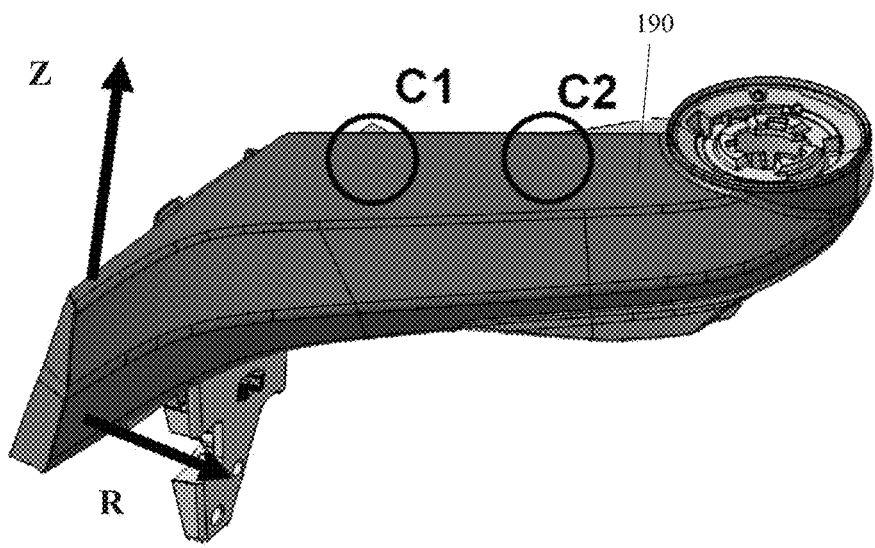
Figure 16G:
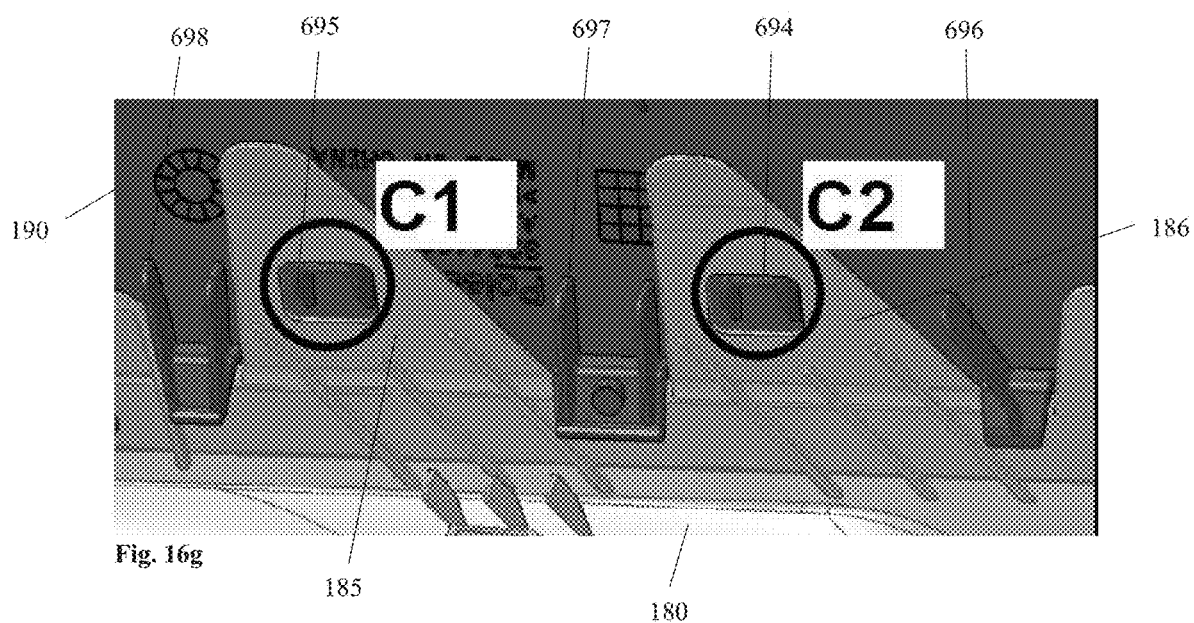

In a third step, shown in FIG. 16*f*, the upper base cover 190 is removed by a compound movement, namely an upward movement in Z-direction and a rotation out along the arrow R. To allow said compound movement of the upper base cover 190, the same must be pulled up to dis-engage the two clips 185 and 186 of the base cover cap 180, i.e. to loosen the engagement shown in FIG. 13*g*. The location of the respective clip connections are indicated by C1 and C2 in FIGS. 16*f* and 16*g*.

Figure 16H:
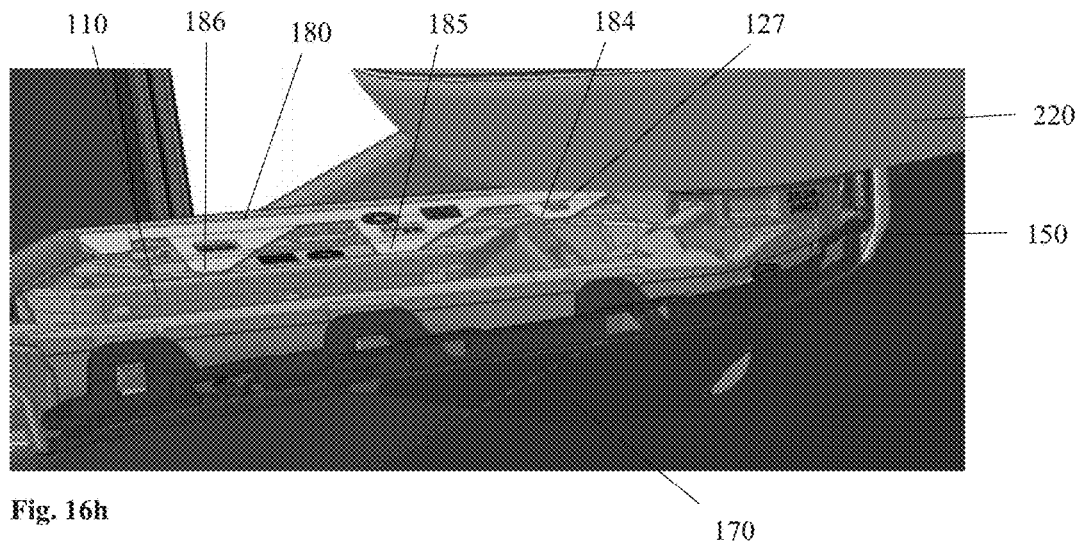
Figure 16I:
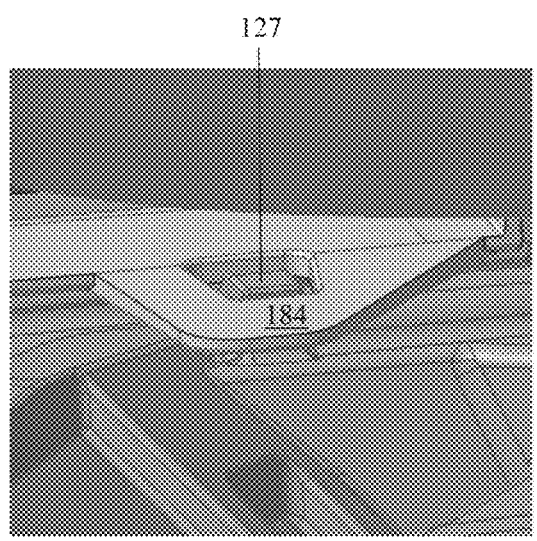
Figure 16J:
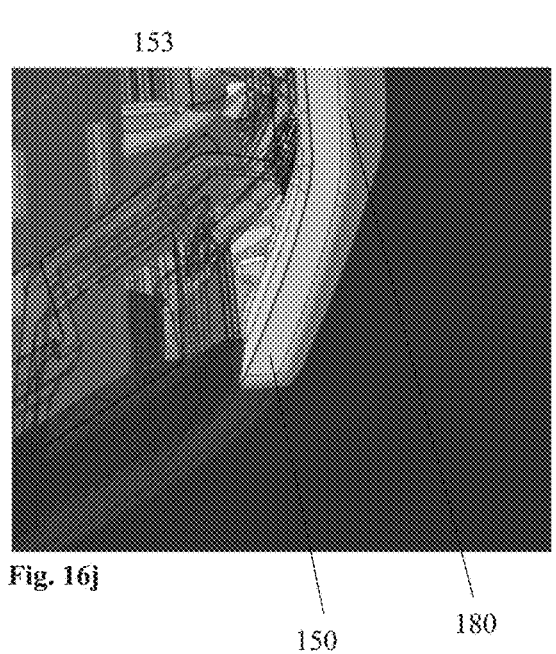

In a fourth step, shown in FIGS. 16*h* to 16*j*, to dismount the base cover cap 180, its clip 184 positioned by a projection 127 of the base frame 110 (FIG. 16*i*) and its peg projections 153 positioned by the lower base cover 170 (FIG. 6*j*) must be dis-engaged. The clip disengagement of FIG. 16*i* will require the tool, while the peg projections dis-engagement of FIG. 16*j* simply needs to be pushed out of position, such that the base cover cap 180 will rotate out.

Figure 16K:
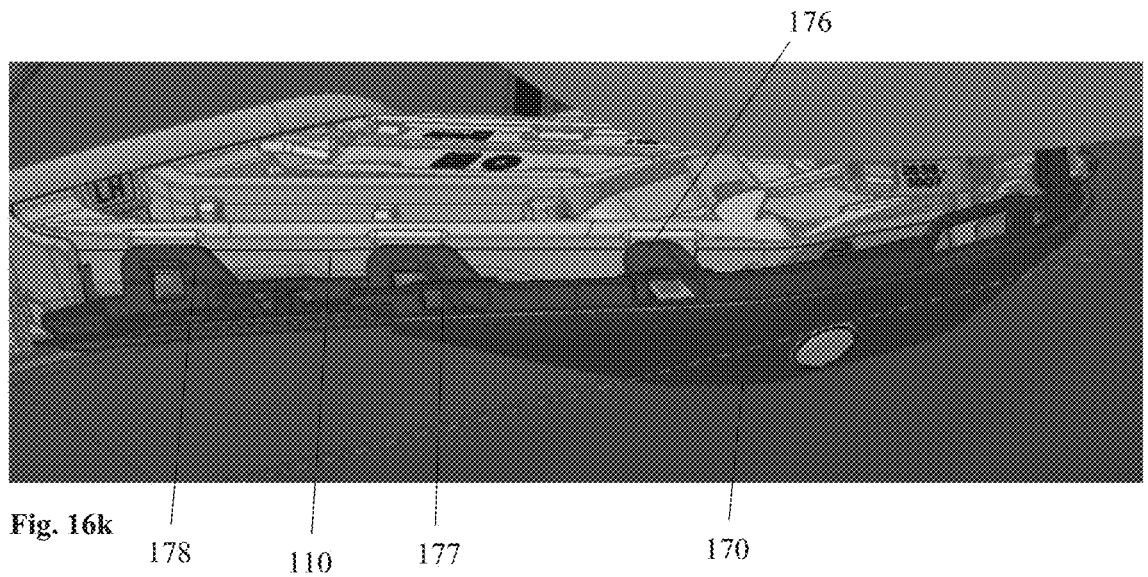
Figure 16L:
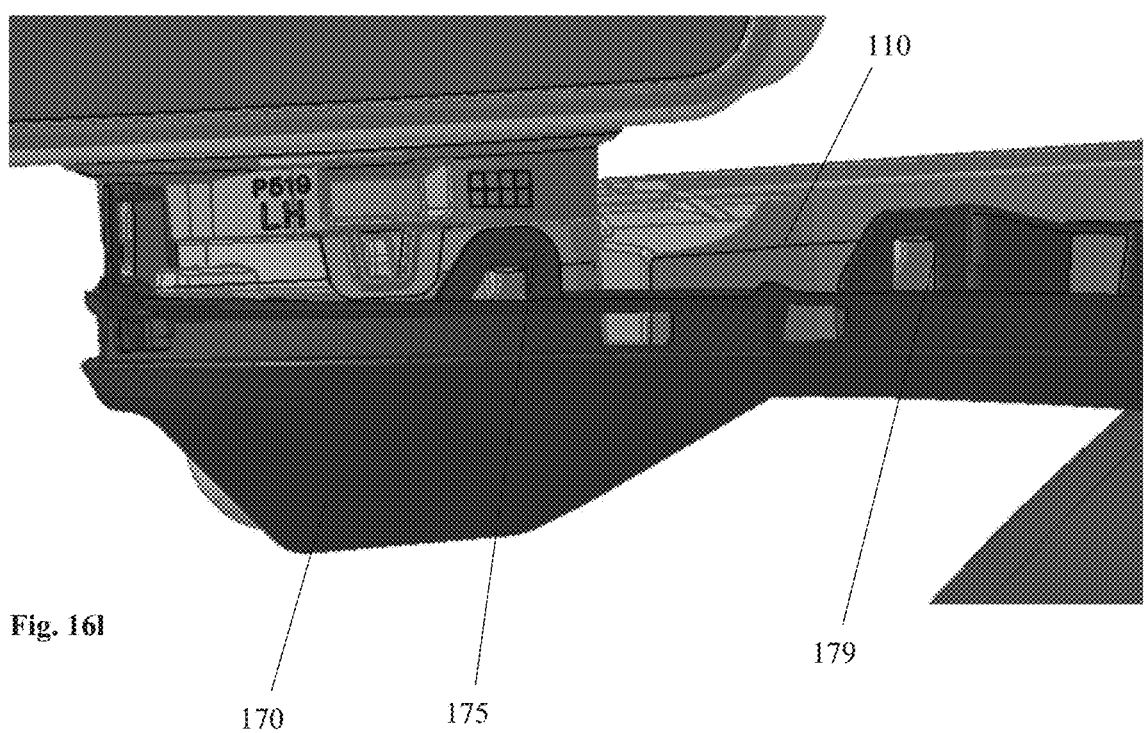

In a fifth step, the five clips 175 to 179 of the lower base cover 170 shown in FIGS. 16*k* and 16*l* have to be dis-engaged from the base frame 110 such that the lower base cover 170 will naturally fall down in the Z-direction and can be removed.

The tool 2000 needed for dis-lodging or dis-engaging the clip connections to dis-assemble all three cover pieces 170, 180 and 190 is explained in the following with respect to FIGS. 17*a* to 17*c*.

Figure 17A:
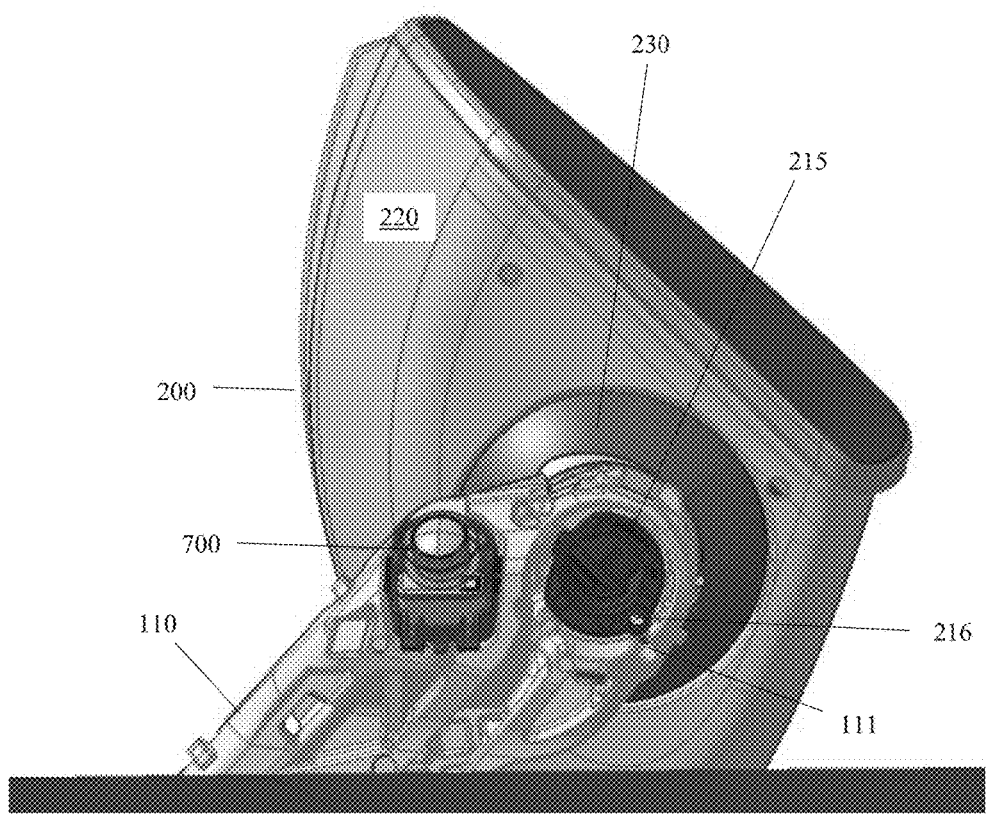
FIGS. 17a to 17c are perspective views demonstrating locking the head assembly during dis-assembly of the camera as shown in FIGS. 15d and 15f.
Figure 17B:
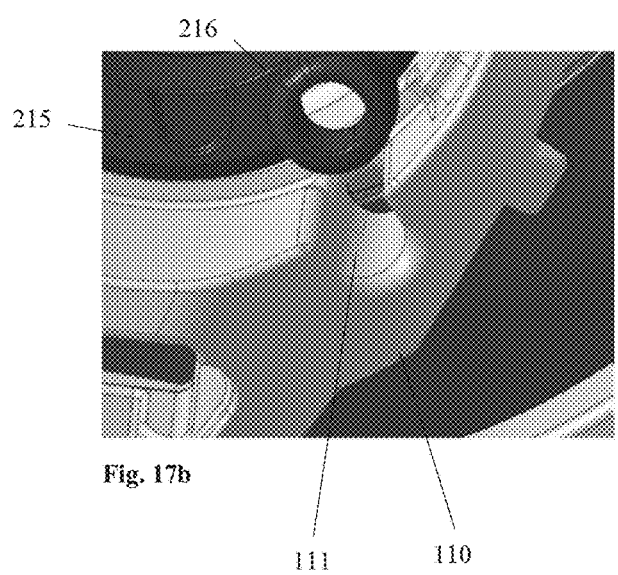
Figure 17C:
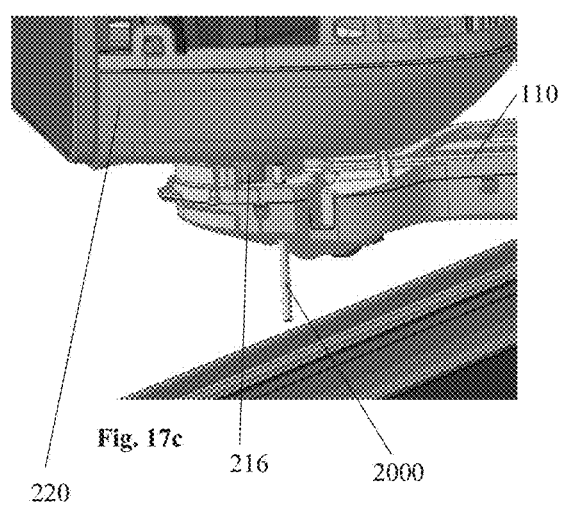

To avoid the mirror head assembly 200 rotating back into its nominal position, that is from the position shown e.g. in FIGS. 15*d*, 15*f* and 17*a* into the position shown e.g. in FIGS. 15*c* and 15*e*, due to a self-return spring mechanism (not shown) and via a pivot joint 230, the tool 2000 with a maximum diameter of 4 mm may be used to lock the base frame 110 relative to the head assembly 200. For that purpose the recess or hole 111 is designed into the base frame 110, which provides easy access to a mechanical stop 216 of a case frame 215 from the bottom of the base assembly 100, after removing the three cover pieces 170, 180 and 190.

All parts the tool 2000 interfaces with are made from aluminum for maximal strength and security. Also the tool 2000 itself may be made out of aluminum.

In summary, the three cover pieces of the present disclosure, namely the lower base cover 170, the base cover cap 180 and the upper base cover 190 are designed to easily mantle the base frame 110 without screw connections, but only via clip, snap and/or latch connections amongst themselves as well as the retainer assembly 300, in particular the sealing means 800, and the base frame 110, for providing an aesthetically pleasing appearance as well as accident-proof by avoiding sharp edges and, in addition, for allowing an adaption of the base assembly design to the vehicle design in an easy manner;

to provide an opening 702 for the camera 700 attached to the base frame 110 via the camera cradle 704, without scratching the camera lens during assembly; and to easily dis-mantle the base frame 110 due to said clip, snap and/or latch connections, in particular making usage of only one tool, especially for camera service.

Figure 18A:
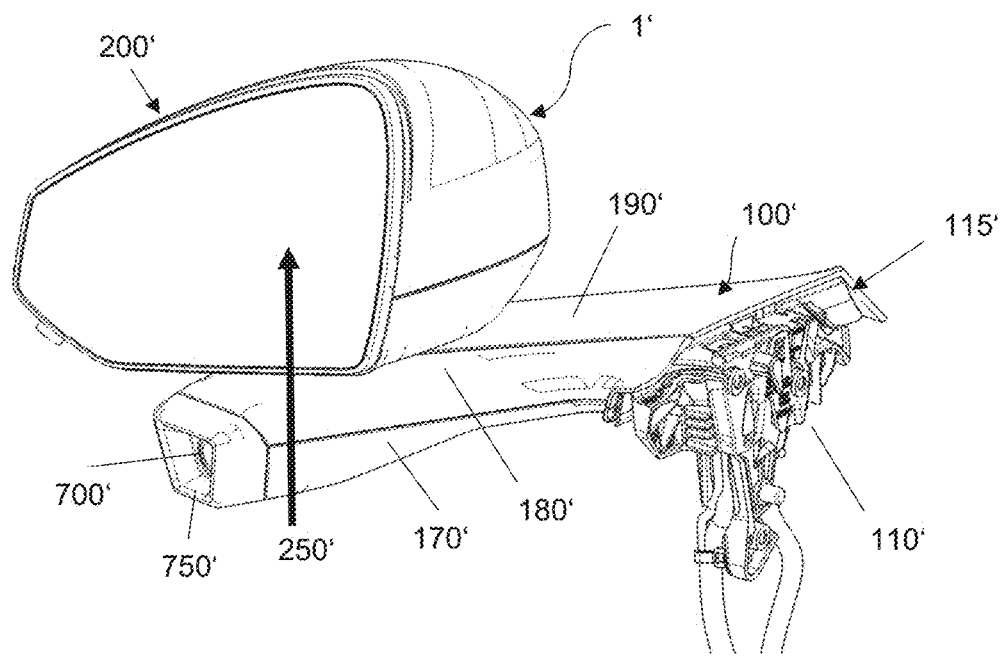
FIG. 18a is a perspective view of a second exterior rear view device of the present disclosure, for carrying a mirror glass, which is at least partly translucent, and a display, and having a further camera arranged within the base assembly.
Figure 18B:
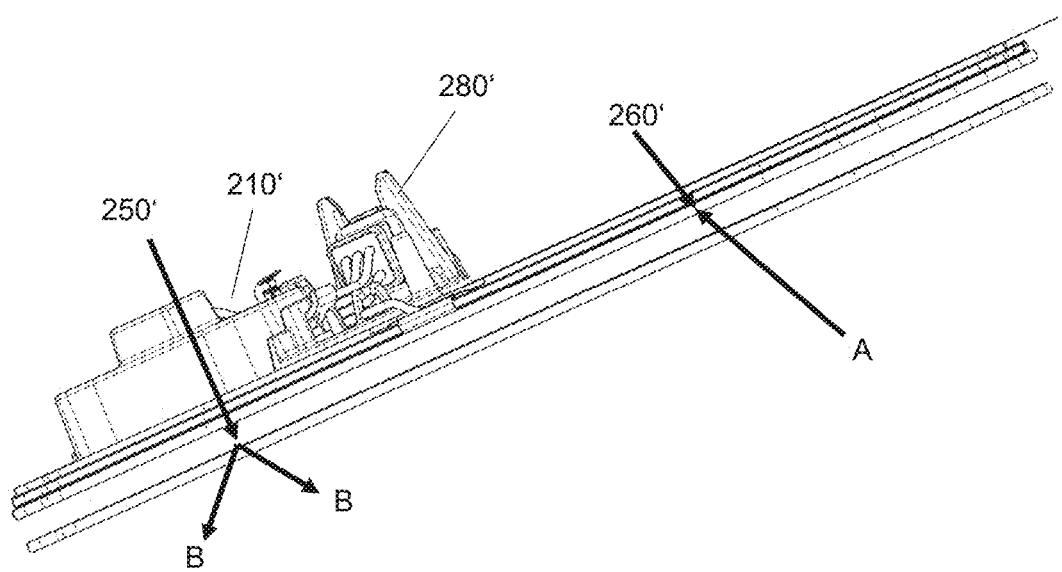

FIGS. 18*a* and 18*b* depict a second external rear view device 1' of the present disclosure. It comprises a base assembly 100' onto which a moveable head assembly 200' is attached, i.e. at a head attachment portion 117' shown in FIGS. 18*c* and 18*d*. The base assembly 100' is configured to be mounted to a vehicle at a door attachment portion 115' as described with respect to the first embodiment.

The head assembly 200' comprises a reflective element 250' in form of an at least partly translucent mirror glass and a display element 260' integrated in the head assembly 200' by being arranged behind the at least partly translucent mirror glass in the view direction of a drive as indicated by the arrow A in FIG. 18*b*. This allows to present to a driver of a vehicle, to which the external rear view device is attached, a rear view either by reflections on the at least partly translucent mirror glass as indicated by the arrows B in FIG. 18*b* or on the display element 260'.

The base assembly 100' comprises a camera 700'. The display element 260' may be activated to present a rear view obtained by the camera 700'. Such an activation may be achieved by the driver for example by pressing a button on a dashboard, via a voice command, by a gesture or the like and/or depending on the output of a sensor (not shown). Such a sensor may be connected to a control unit 280' for controlling the display element 260' and maybe also an articulation assembly 210' for moving the head assembly 200'. Said control unit 280' may be arranged within the head assembly 200' as shown in FIG. 18*b*, but may also be arranged within the vehicle.

A sensor signal characteristic for contamination of a lens 720' of the camera 700' may be used to switch off the display unit 260', whereas another sensor signal characteristic for high traffic situations and/or high speed may be used to switch on the display element 260', but many alternatives are within the teaching of the present disclosure.

Figure 18C:
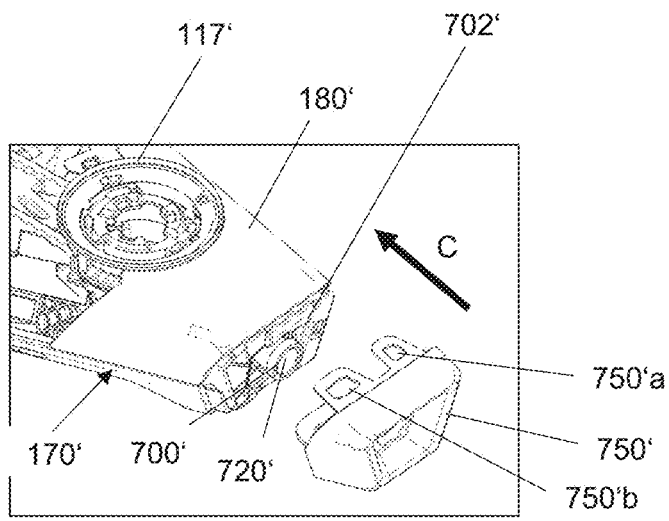
FIG. 18c is a perspective view of the external end of the base assembly of the rearview device of FIG. 18a, prior to attachment of a glare shield.

The camera unit 700' is arranged in the base assembly 100' such that the lens 720' may obtain a rear view image through an opening 702' provided by the base assembly 100', see FIG. 18c. In detail, the camera 700' may be attached to a base frame 110', via a camera cradle 704', as best seen in FIG. 18e, and the opening 702' may be provided by cover pieces of the base frame 110'. Said cover pieces may comprise three pieces as described with respect to the first embodiment with respect to the FIGS. 1 to 17c, namely a base cover cap 180', a lower base cover 170' and an upper base cover 190'. Said three base covers 170', 180' and 190' releasably mantle the base frame 110' by being attached via clip, snap and/or latch connections.

Figure 18D:
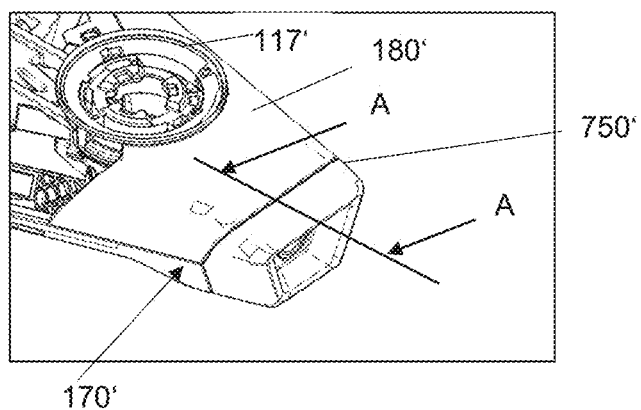
FIG. 18d is a perspective view of the external end of the base assembly of the rearview device of FIG. 18a, with the attached glare shield.
Figure 18E:
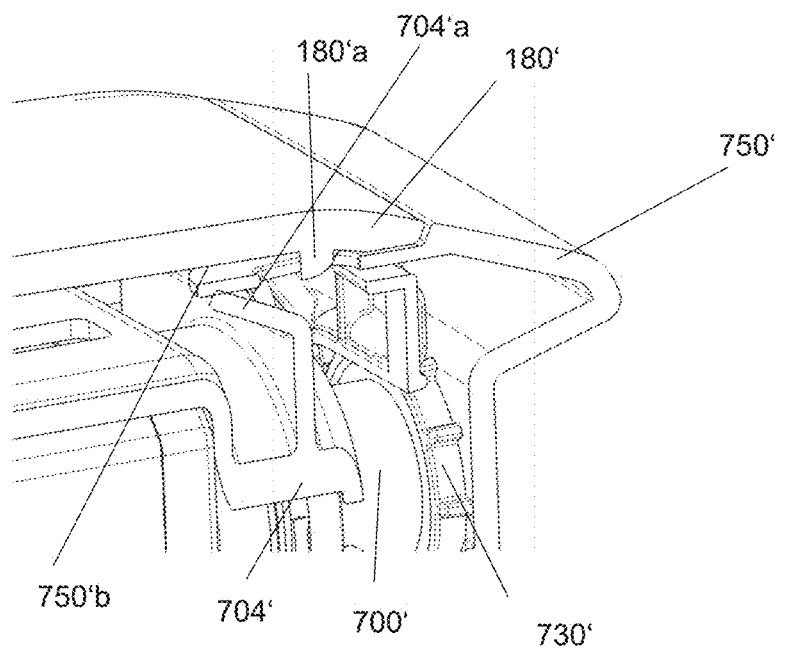
FIG. 18e is a cross-sectional view along the line AA shown in FIG. 18d.

Still further, the cover of the base frame 110' may comprise a glare shield 750', which is described in further detail with respect to FIGS. 18c to 18e.

As can be seen in FIGS. 18c and 18e, the glare shield 750' is provided with two clips 750'a, 750'b to be attached to the base cover cap 180' as well as to the camera cradle 704', which serves to attach the camera 700' to the base frame 110'. This attachment may be the last assembly step on a customer line by sliding the glare shield 750' along the arrow C as indicated in FIG. 18c.

FIG. 18d shows the assembled glare shield 750' and details thereof can be seen in the cross-section taken along line A-A in FIG. 18e. Accordingly, each clip 750'a, 750'b or the like of the glare shield 750' engages the base cover cap 180', in particular an extension, lug 180'a or the like thereof. The free end of the clip 750'b is shown in FIG. 18e to be holed by a retention tab 704'a of the camera cradle 704'. This arrangement allows to maintain a small tolerance stack between the different components, with integrity of the glare shield 750' being protected. Further, serviceability is facilitated by this arrangement.

FIG. 18e also shows that an outer-rim 730' of the camera unit 700' extends beyond the camera cradle 704' as well as the base cap cover 180', but is shielded by the glare shield 750'. The rim 730' encompasses the lens 720'.

Figure 19A:
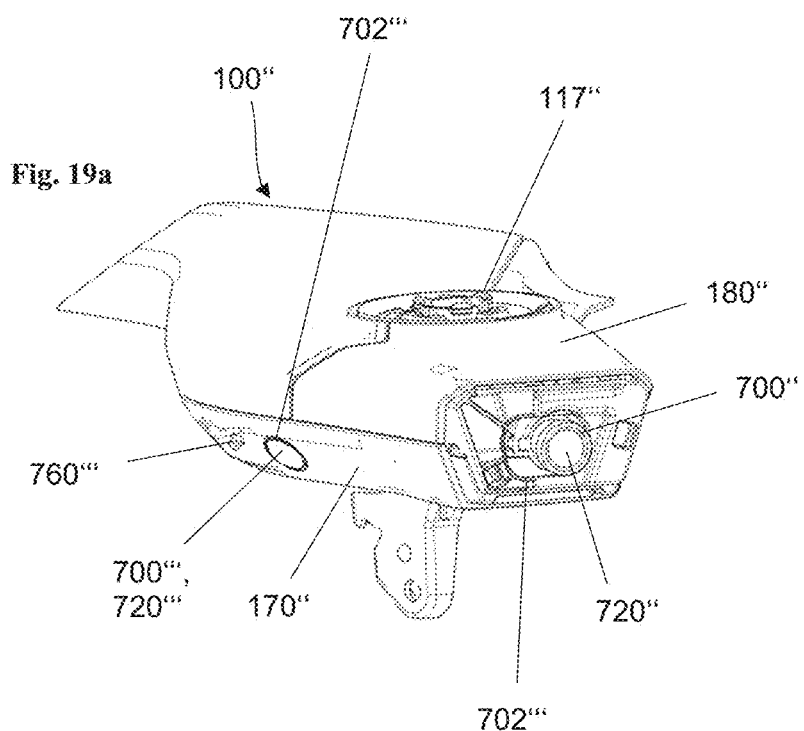
FIG. 19a is a perspective view of a base assembly of a third exterior rear view device of the present disclosure.

The releasable mantling of the base frame by cover pieces as described for the first and second embodiment, allow for many more alternatives. FIG. 19a shows such a further alternative in form of a base assembling 100" of a third rear view device of the present disclosure making usage of a base assembly 100" equipped with two cameras 700", 700''', which may be arranged substantially perpendicular to each other and an axis of a head attachment portion 117".

A first camera 700" may extend through an opening 702" in a base cover cap 180" with its lens 720" as described with respect to FIGS. 18a to 18e. A glare shield as described above may be attached. A second camera 700''' may be arranged such that its lens 720''' extends through an opening 702''' in the lower base cover 170'''. A cleaning system may be associated with the second camera 700''', which may comprise a nozzle 760''' attached to and/or extending through the lower base cover 170". The cleaning system may be controlled by a control unit in dependency of the output of a sensor sensing contamination. For example, the cleaning system may be activated when the sensor's output indicates that there is contamination on the lens.

Figure 19B:
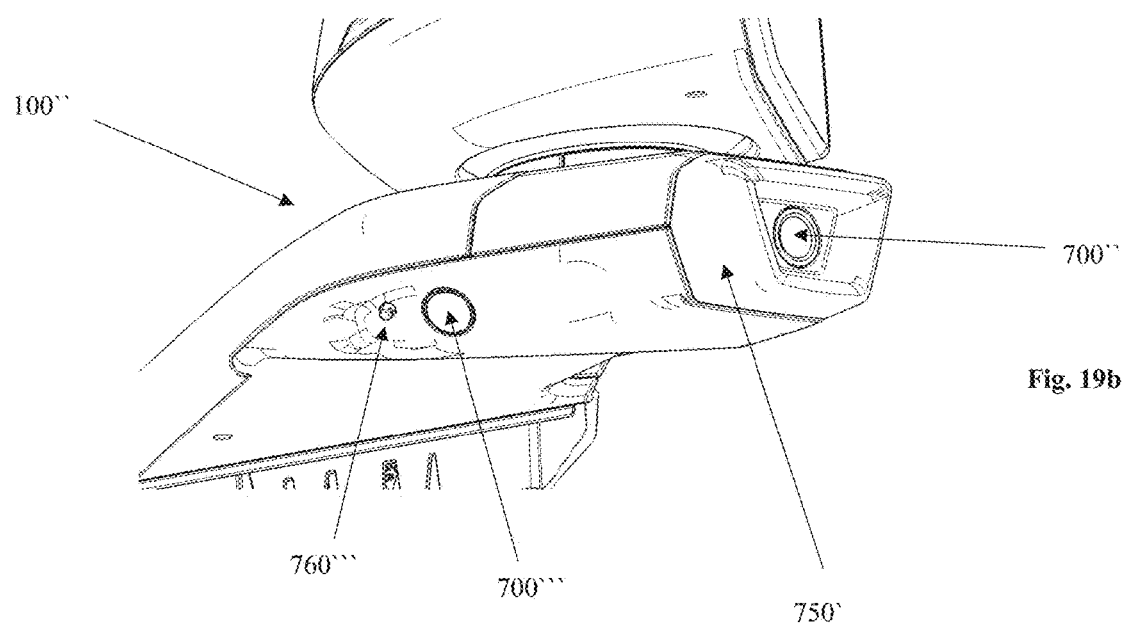
FIG. 19b is another perspective view of a base assembly of a third exterior rear view device of the present disclosure.

FIG. 19b shows another view of the base assembling 100" of a third rear view device of the present disclosure making usage of a base assembly 100". The first camera 700" is arranged such that it is protected by a glare shield 750'. The second camera 700''' is arranged next to the cleaning system that comprises a cleaning nozzle such that the second camera may be cleaned by a cleaning fluid dispensed by cleaning nozzle 760'''.

Figure 19C:
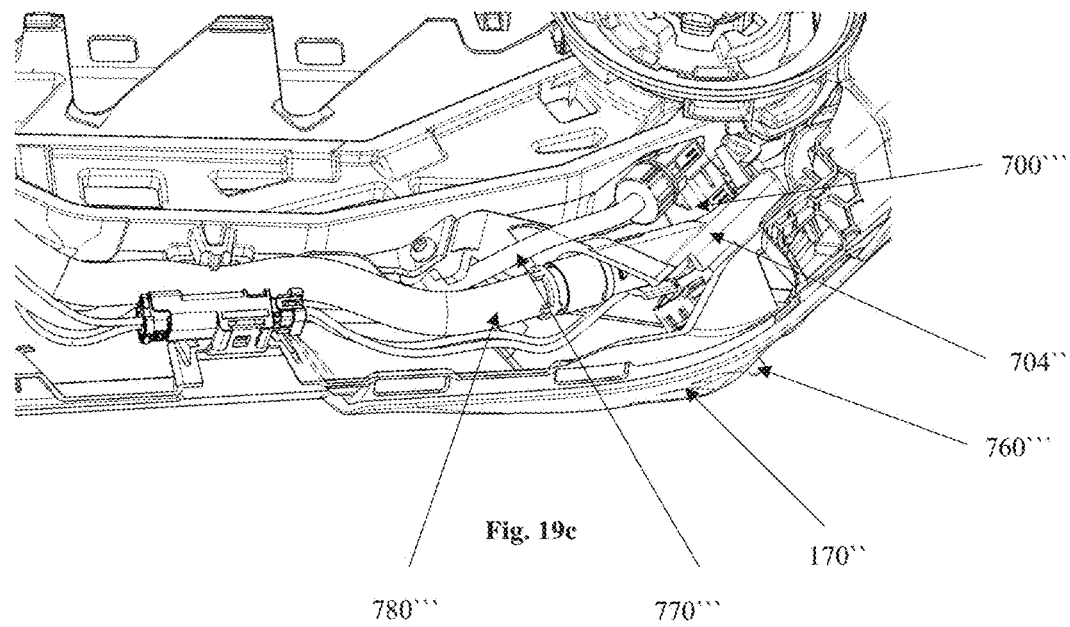
FIGS. 19c and 19d are cross sectional views of the rear view device of FIGS. 19a and 19b.
Figure 19D:
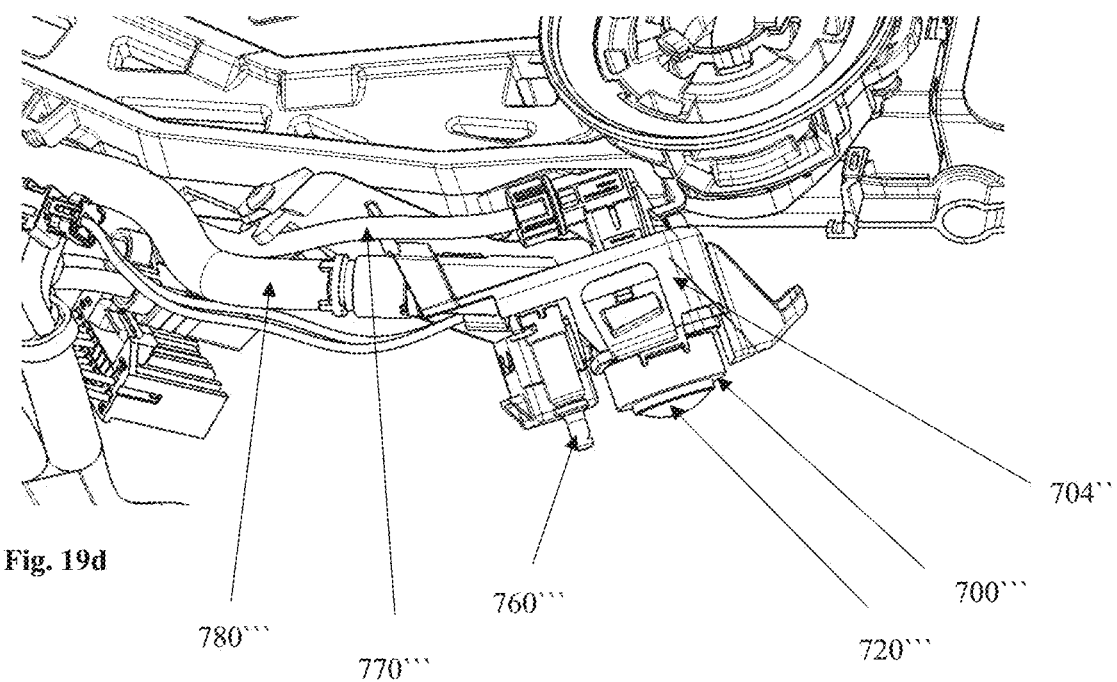

FIGS. 19c and 19d show the cleaning nozzle 760''', the second camera 700''' and the lens of the second camera 720''', and a cradle 704" These figures show that cradle 704" holds both the second camera 700''' and cleaning nozzle 760'''. The cradle is attached to the lower base cover 170". The cradle 704" may be a plastic unit that is provided for isolating the second camera 700''' from the base frame. And the cradle 704" may be configured to be attached to the base frame by a friction fit and without any separable attachment element.

Additionally, shown in FIGS. 19c and 19d is a cleaning fluid conduit 780''' that delivers cleaning fluid to the cleaning nozzle. Additionally, these figures show a cable 770''' that is connected to the second camera 700'''. Cable 770''' may, for example, provide power and/or a data exchange to the second camera. The cleaning fluid conduit 780''' and the cable 770''' may both extend between the base frame and the base cover, and may be at least partly substantially parallel to each other.

The embodiment shown in FIGS. 19a-19d may be connected to an exterior rearview device of a vehicle. The exterior rear view device may include a head assembly for supporting at least one of: a reflective element, a display element, and a third camera. The head assembly may be attached to the base assembly in a moveable manner. In embodiments, the external rear view device may further comprise at least one of an articulation assembly for moving the head assembly relative to the base assembly, and at least one functional device, comprising a light module, a turn signal indicator module, a blind spot indicator module, or a human machine interface, a Bluetooth module, a sensor module, a temperature sensor, a touch sensor or a contamination sensor, and a control unit. The control unit may particularly be adapted for controlling at least one of the cleaning system, the first camera, the second camera, the display element, the articulation assembly and the functional device. In embodiments, the display element of the external rearview device is configured to be at least one of, viewable through the reflective element when activated, activated by at least one of a driver of the vehicle depending on an output signal of the sensor module, via a vehicle control system and via the control unit and displaying images obtained from at least one of the first camera, the second camera and the third camera. A vehicle with a door having a door panel and supporting a window as well as a cheater panel sealed by a glass run seal, may include a door panel that supports the exterior rearview device described herein.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1, 1' exterior rear view device
2 vehicle
100, 100', 100" base assembly
101 clip
102 clip
103 clip
104 clip
105 clip
106 clip
107 clip
108 hook aperture
109 hook aperture 110, 110' base frame
111 hole
115, 115' door attachment portion
116 arm
117, 117', 117" head attachment portion
118 hook aperture
120 location pin
121 T shaped location projection
122 camera guiding wall
123 camera harness guiding channel portion
124 opening for harness holder
125 location projection
126 location projection
127 location projection
131 screw opening
132 screw opening
135 step for sealing means clip
136 step for sealing means clip
137 opening for retainer means clip
138 opening for sealing means clip
140 harness guiding channel portion
141 harness guiding channel portion
150 projection
151 slot
152 tab
153 projection
160 pocket
161 opening
162 opening
163 wall
164 opening
165 opening
166 drain hole
167 opening
168 opening
170, 170', 170" lower base cover
171 multi-functional assembly projection
172 hook
173 hook
174 hook
175 clip
176 clip
177 clip
178 clip
179 clip
180, 180' base cover cap
180'a lug
184 clip
185 clip
186 clip
190, 190', 190" upper base cover
192 location projection
193 location projection
194 location projection
195 location projection
198 clip
199 hoop clip
200, 200' head assembly
210, 210' actuator assembly
215 case frame
216 mechanical stop
220 lower case
222 opening of lower case
230 pivot joint
250' reflective element
260' display element
280' control unit
300 retainer assembly
301 retainer means
310 sealing portion
315 clip
316 clip
320 holding portion
322 opening for location pin
340 camera harness guiding channel portion
350 hook
351 opening for arm of T shaped location projection
360 clip
371 opening
372 opening
380 opening for sealing means clip
391 T-slot
400 harness
410 camera harness
420 guiding channel
500 harness holder
510 fixing tie
520 clip
600 door
605 door panel
610 opening for hook
611 slot
620 opening for location pin
631 screw opening
632 screw opening
640 cheater panel
691 location peg
692 location peg
694 clip retention extension
695 clip retention extension
696 alignment projection
697 alignment projection
698 alignment projection
700, 700', 700", 700''' camera
702, 702', 702", 702''' opening
704, 704', 704" camera cradle
704'a tab
705 camera connector
710 turn signal indicator
720', 720", 720''' lens
730' rim
750' glare shield
750'a, 750'b clip
742 location rib
744 clip
746 anti-backout projections
760''' cleaning nozzle
770''' cable
780''' cleaning fluid conduit
800 sealing means/2K door gasket
802 door gasket seal
804 door gasket substrate
810 clip
820 clip opening
830 clip
840 clip
850 datum area for upper case
851 T-slot
860 hook pocket
862 hook pocket
866 projection
870 rib
872 rib
881 screw opening 882 screw opening
900 channel
920 glass run seal
922 sealing lip
940 waist finisher
1000 window
2000 tool

The invention claimed is:

1. A base assembly of an exterior rear view device configured to be mounted to a vehicle for moveably supporting a head assembly of the exterior rear view device, comprising:
   a camera with a lens;
   a cleaning system with a nozzle for dispensing a cleaning fluid onto the lens;
   a base frame;
   a base cover, comprising a plurality of cover pieces, which provide a first opening for the lens and a second opening for the nozzle; and
   a camera cradle for holding both the camera and the nozzle,
   wherein a cleaning fluid conduit that is connected to the nozzle and at least one cable that is connected to the camera extend between the base frame and the base cover, wherein the cleaning fluid conduit and the at least one cable are at least partly substantially parallel to each other.

2. The base assembly of claim 1, wherein the plurality of cover pieces comprises:
   a base cover cap;
   a lower base cover; and
   an upper base cover,
   wherein the base cover cap, the lower base cover and the upper base cover together are designed to releasably mantle the base frame by attaching to the base frame via one or more of a clip, a snap, or a latch connection.

3. The base assembly of claim 2, wherein at least one of the nozzle and the lens extends through the lower base cover.

4. The base assembly of claim 2, wherein the camera cradle attaches the camera and the nozzle to the lower base cover.

5. The base assembly of claim 1, wherein the cleaning system is controlled by a control unit that activates the cleaning system when an output of a sensor indicates that contamination exists on the second lens.

6. The base assembly of claim 1, further comprising a second camera, wherein the second camera is orientated substantially perpendicular to the camera.

7. The base assembly of claim 6, wherein the second camera or a lens of the second camera extends through an opening in the base cover cap.

8. The base assembly of claim 6, wherein the plurality of cover pieces comprises a glare shield for the second camera.

9. The base assembly of claim 8, wherein the glare shield comprises a first clip and a second clip, and the first clip and the second clip connect the glare shield to the base cover cap and a second camera cradle for attaching the second camera.

10. The base assembly of claim 1, wherein a cleaning fluid conduit is connected to the nozzle and is configured to supply cleaning fluid to the nozzle.

11. The base assembly of claim 1, wherein at least one cable connects to and provides power for the camera and allows for a data exchange.

12. The base assembly of claim 1, wherein the camera cradle is a plastic unit for isolating the camera from the base frame.

13. The base assembly of claim 1, wherein the cradle is configured to be attached to the base frame by a friction fit and without any separable attachment element.

14. The base assembly of claim 1, where the camera cradle is mounted to the base frame for holding both the camera and the nozzle.

15. An exterior rearview device comprising:
   a base assembly configured to be mounted to a vehicle for moveably supporting a head assembly of the exterior rear view device, the base assembly comprising:
   a camera with a lens;
   a cleaning system with a nozzle for dispensing a cleaning fluid onto the lens;
   a base frame;
   a base cover, comprising a plurality of cover pieces, which provide a first opening for the lens and a second opening for the nozzle; and
   a camera cradle mounted to the base frame for holding both the camera and the nozzle,
   wherein a cleaning fluid conduit that is connected to the nozzle and at least one cable that is connected to the camera extend between the base frame and the base cover, wherein the cleaning fluid conduit and the at least one cable are at least partly substantially parallel to each other.

16. An exterior rear view device comprising the base assembly of claim 15,
   wherein the head assembly is configured to support at least one of a reflective element, a display element, or a third camera; and
   wherein the head assembly is attached to the base assembly in a moveable manner.

17. The external rear view device of claim 16, further comprising at least one of:
   an articulation assembly for moving the head assembly relative to the base assembly
   at least one functional device, comprising at least one of a light module, a turn signal indicator module, a blind spot indicator module, a human machine interface, a Bluetooth module, a sensor module, a temperature sensor, a touch sensor or a contamination sensor; or
   a control unit.

18. The external rear view device of claim 17, wherein the control unit is adapted for controlling at least one of the cleaning system, the camera, a second camera, the third camera, the display element, the articulation assembly, or the at least one functional device.

19. The external rear view device of claim 17, wherein the display element is configured to be at least one of:
   viewable through the reflective element when activated;
   activated by at least one of:
     a driver of the vehicle, depending on an output signal of the sensor module,
     via a vehicle control system, or
     via the control unit; or
   displaying images obtained from at least one of the camera, a second camera, or the third camera.

20. A vehicle with a door having a door panel and supporting a window as well as a cheater panel sealed by a glass run seal, wherein the door panel also supports the exterior rearview device of claim 15.

* * * * *